United States Patent
Kang et al.

(10) Patent No.: US 9,520,987 B2
(45) Date of Patent: Dec. 13, 2016

(54) SYSTEMS AND METHODS FOR TIMING RECOVERY IN NEAR-FIELD COMMUNICATION

(71) Applicant: QUALCOMM Incorporated, San Diego, CA (US)

(72) Inventors: Eunmo Kang, San Diego, CA (US); Le Nguyen Luong, San Diego, CA (US); Koorosh Akhavan, San Diego, CA (US); Rajapaksa Senaratne, San Diego, CA (US); Thomas Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/628,798

(22) Filed: Feb. 23, 2015

(65) Prior Publication Data
US 2015/0256324 A1 Sep. 10, 2015

Related U.S. Application Data

(60) Provisional application No. 61/949,829, filed on Mar. 7, 2014.

(51) Int. Cl.
*H04L 7/00* (2006.01)
*H04B 5/00* (2006.01)
(Continued)

(52) U.S. Cl.
CPC .......... *H04L 7/0016* (2013.01); *H04B 5/0031* (2013.01); *H04B 5/0056* (2013.01);
(Continued)

(58) Field of Classification Search
CPC ...... H04L 7/033; H04L 7/0337; H04L 7/0338; H04L 7/0008; H04L 7/02; H04L 7/0331; H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04L 1/0003; H03L 7/0814; G06F 1/10; H04B 7/0417; H04B 7/0669; H04B 3/54
(Continued)

(56) References Cited

U.S. PATENT DOCUMENTS

| 8,838,481 B2 | 9/2014 | Moshfeghi | |
|---|---|---|---|
| 2003/0194024 A1* | 10/2003 | Edde | H04L 7/0062 375/326 |

(Continued)

OTHER PUBLICATIONS

Identification Cards—Contactless Integrated Circuit Cards—Proximity Cards—Proximity Cards—Part-1—Physical characteristics//Cartes D Identification—Cartes A Circuit(S) Integre(S) Sans Contact—Caries De Proximite—, International Standard ISO/IEC No. 14443-1, Second edition, Jun. 15, 2008, pp. 1-12.
(Continued)

*Primary Examiner* — Zewdu Kassa
(74) *Attorney, Agent, or Firm* — Austin Rapp & Hardman

(57) ABSTRACT

A method for inductively-coupled communications is described. The method includes receiving a signal. The method also includes analyzing the signal to estimate a symbol timing error. Estimating the symbol timing error may include comparing a location of a pause, a low-to-high or a high-to-low transition in the received signal with an ideal location of a pause or a transition. The method further includes adjusting symbol timing to correct for the symbol timing error.

20 Claims, 19 Drawing Sheets

(51) Int. Cl.
*H04L 25/49* (2006.01)
*H04B 5/02* (2006.01)
*H04L 7/033* (2006.01)
*H04L 7/04* (2006.01)

(52) U.S. Cl.
CPC ........... *H04B 5/0075* (2013.01); *H04L 25/49* (2013.01); *H04B 5/02* (2013.01); *H04L 7/033* (2013.01); *H04L 7/04* (2013.01)

(58) Field of Classification Search
USPC ............... 375/371, 354, 316, 295, 319, 267, 261,375/260, 259, 219
See application file for complete search history.

(56) References Cited

U.S. PATENT DOCUMENTS

| 2004/0101068 A1* | 5/2004 | Wang | H04B 1/7093 |
| | | | 375/324 |
| 2009/0041241 A1 | 2/2009 | Dobyns et al. | |
| 2010/0115349 A1* | 5/2010 | Ho | H04B 5/0075 |
| | | | 714/700 |
| 2011/0299643 A1* | 12/2011 | Huang | H04L 7/0337 |
| | | | 375/371 |
| 2013/0171931 A1* | 7/2013 | Leutgeb | H04W 76/023 |
| | | | 455/41.1 |
| 2014/0017997 A1 | 1/2014 | Sung | |
| 2014/0073241 A1 | 3/2014 | Luong et al. | |
| 2014/0086347 A1 | 3/2014 | Kang | |

OTHER PUBLICATIONS

NFC Forum, "NFC Digital Protocol", Technical Specification, NFCForum-TS-Digital Protocol-1.0, Nov. 17, 2010, 194 pages.

* cited by examiner

SYSTEMS AND METHODS FOR TIMING RECOVERY IN NEAR-FIELD COMMUNICATION

RELATED APPLICATIONS

This application is related to and claims priority from U.S. Provisional Patent Application Ser. No. 61/949,829, filed Mar. 7, 2014, for "Time Tracking Loop for Target Receiver of Near-Field Communication."

TECHNICAL FIELD

The described technology generally relates to an apparatus and method of wireless communication. More particularly, the technology relates to a receiver design and optimization for wireless near-field communication (NFC).

BACKGROUND

The wireless communication environment in a home or an office generally includes a number of independently developed radio access technologies and standards. These technologies were initially designed for target applications and they perform relatively well for these applications. In a typical home or office environment, an access to content (e.g., web, video, etc.) is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, cell phones, laptops, printers, and other wireless stations using 802.11-based Wi-Fi technology.

Another communication medium currently being implemented in electronic equipment is near-field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces is typically capable of operating as radio frequency (RF) readers and/or writers to communicate with other NFC devices. A basic aspect of NFC is the use of electromagnetic waves in an RF range and the transmission of information contents is realized over a short distance only, for instance in a range of about several centimeters.

RFID technology is widely used in many areas such as public transportation services, object tracking systems and home management, and it is growing rapidly. It can handle the information from tags. The RFID application technology is currently integrated in one chip. 13.56 MHz RFID reader specification is based on the standard including ISO 14443 type-A, type-B, ISO 15693 and ISO 18000-3 standards. In NFC or an RFID application, a transmitter of a proximity coupling device (PCD), also known as a reader, writer or initiator, may use one of following three linear codes, followed by an amplitude modulation: (1) a modified-Miller code used for NFC type-A, (2) a non-return-to-zero (NRZ) code used in NFC type-B, and (3) a Manchester code used in NFC type-F.

SUMMARY

A method for inductively-coupled communications is described. The method includes receiving a signal. The method also includes analyzing the signal to estimate a symbol timing error. The method further includes adjusting symbol timing to correct for the symbol timing error.

Estimating the symbol timing error may include comparing a location of a pause, a low-to-high or a high-to-low transition in the received signal with an ideal location of a pause or a transition. Estimating the symbol timing error may include detecting timing of a beginning of each character. Estimating the symbol timing error may be based on the output of one or more accumulators that accumulate samples during different periods in a bit duration.

Adjusting the symbol timing may include incrementing initial symbol timing by a fixed bit duration.

Modulation may be performed in accordance with a near-field communication (NFC) type-A standard. In this case, estimating the symbol timing error may include comparing a location of a pause in the received signal with an ideal location of a pause corresponding to a decoded bit. Adjusting the symbol timing may include adding or subtracting the estimated symbol timing error from a sample counter.

Modulation may be performed in accordance with an NFC communication type-F standard. In this case, estimating the symbol timing error may include comparing a location of a low-to-high or a high-to-low transition in the received signal with an ideal location of a transition. Adjusting the symbol timing may include adding or subtracting the estimated symbol timing error from a sample counter.

Modulation may be performed in accordance with an NFC type-B standard in which data is sent in characters. In this case, estimating the symbol timing error may include detecting timing of a beginning of each character. Adjusting the symbol timing may include incrementing initial symbol timing by a fixed bit duration.

In another configuration in which modulation may be performed in accordance with an NFC type-B standard in which data is sent in characters, estimating the symbol timing error may include detecting timing of a beginning of each character and comparing a location of a low-to-high or high-to-low transition in the received signal with an ideal location of a transition. Adjusting the symbol timing may include adding or subtracting the estimated symbol timing error from a sample counter.

A receiver for inductively-coupled communications is also described. The receiver includes a slicer that receives output samples from an analog-to-digital converter (ADC) and generates a bit stream. The receiver also includes an acquisition block that acquires packets and initial symbol timing. The receiver further includes a decoder. The receiver additionally includes a time tracker block that analyzes the signal to estimate a symbol timing error based on the initial symbol timing and the bit stream. The time tracker block also adjusts symbol timing to correct for the symbol timing error. The time tracker block provides the symbol timing to the decoder.

Estimating the symbol timing error may include the time tracker block comparing a location of a pause, a low-to-high or a high-to-low transition in the received signal with an ideal location of a pause or a transition. The time tracker block may estimate the symbol timing error based on the output of one or more accumulators that accumulate samples during different periods in a bit duration.

When modulation is performed in accordance with an NFC type-A standard, the time tracker block may estimate the symbol timing error by comparing a location of a pause in a received signal with an ideal location of a pause corresponding to a decoded bit. The time tracker block may adjust the symbol timing by adding or subtracting the estimated symbol timing error from a sample counter.

When modulation is performed in accordance with an NFC type-F standard, the time tracker block may estimate the symbol timing error by comparing a location of a low-to-high or a high-to-low transition in a received signal with an ideal location of a transition. The time tracker block may adjust the symbol timing by adding or subtracting the estimated symbol timing error from a sample counter.

When modulation is performed in accordance with an NFC type-B standard in which data is sent in characters, the time tracker block may estimate the symbol timing error by detecting timing of the beginning of each character. The time tracker block may adjust the symbol timing by incrementing initial symbol timing by a fixed bit duration.

In another configuration, when modulation is performed in accordance with an NFC type-B standard in which data is sent in characters, the time tracker block may estimate the symbol timing error by detecting timing of a beginning of each character and comparing a location of a low-to-high or high-to-low transition in a received signal with an ideal location of a transition. The time tracker block may adjust the symbol timing by adding or subtracting the estimated symbol timing error from a sample counter.

An apparatus for inductively-coupled communications is also described. The apparatus includes means for receiving a signal. The apparatus also includes means for analyzing the signal to estimate a symbol timing error. The apparatus further includes means for adjusting symbol timing to correct for the symbol timing error.

A computer-program product for inductively-coupled communications is also described. The computer-program product includes a non-transitory computer-readable medium having instructions thereon. The instructions include code for causing an electronic device to receive a signal. The instructions also include code for causing the electronic device to analyze the signal to estimate a symbol timing error. The instructions further include code for causing the electronic device to adjust symbol timing to correct for the symbol timing error.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
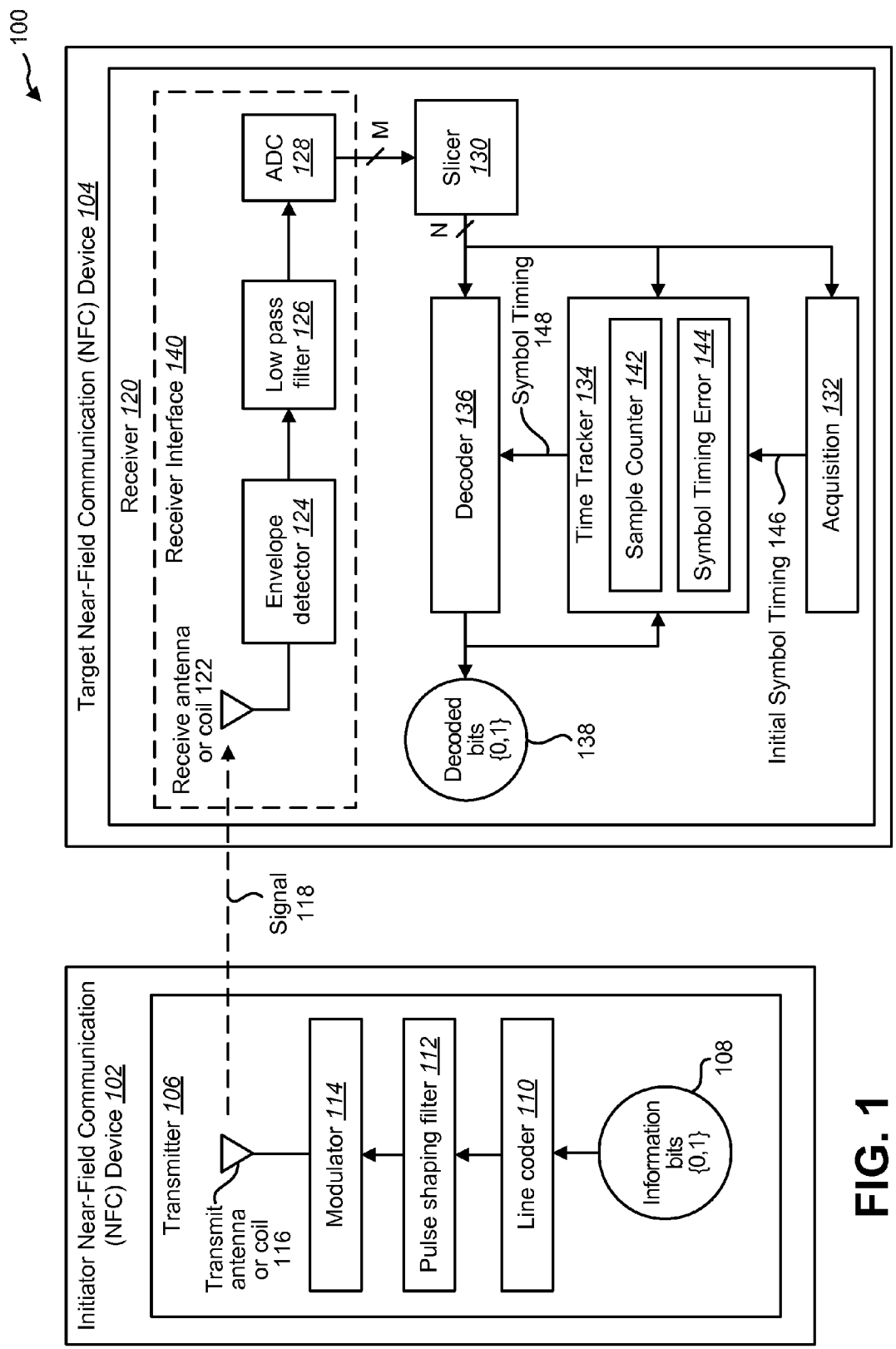
FIG. 1 is a block diagram illustrating one configuration of a near-field wireless communication system for timing recovery.

FIG. 1 is a block diagram illustrating one configuration of a near-field wireless communication system 100 for timing recovery. The wireless communication system 100 may include an initiator near-field communication (NFC) device 102 and a target NFC device 104. Aspects of the present disclosure relate to the initiator NFC device 102 transmitting a signal 118 (e.g., packet) and target NFC device 104 receiving the signal 118.

NFC is an inductively coupled communication. Therefore, the initiator NFC device 102 may also be referred to as an inductively coupled communication device. The antenna 116 of the initiator NFC device 102 produces a radiated field (also referred to as a magnetic field or an electromagnetic field) that is received by the antenna 122 of the target NFC device 104. In the context of near-field communications, there are two devices communicating: an initiator and a target. The initiator NFC device 102 has a transmitter 106 and a receiver (for the sake of clarity, the initiator receiver is not shown in FIG. 1). The target also has a transmitter and a receiver 120 (for the sake of clarity, the target transmitter is not shown in FIG. 1). The initiator NFC device 102 may also be referred to as a poller, polling device or initiator. The target NFC device 104 may also be referred to as a listener, listening device or target.

The initiator NFC device 102 and the target NFC device 104 may use one or more NFC signaling technologies to communicate with each other. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one configuration, the initiator NFC device 102 and the target NFC device 104 may be operable to communicate using NFC through various interfaces, such as a frame radio frequency (RF) interface, ISO-data exchange protocol (DEP) RF interface and NFC-DEP RF interface. In another configuration, the initiator NFC device 102 and the target NFC device 104 may establish an NFC-DEP RF protocol-based communication link with link layer connections defined through a logical link control protocol (LLCP). In still another configuration, the initiator NFC device 102 and the target NFC device 104 may be operable to be connected to an access network and/or core network (e.g., a CDMA network, a GPRS network, a UMTS network, and other types of wireline and wireless communication networks).

The initiator NFC device 102 may poll for nearby NFC devices. The target NFC device 104 may begin to listen when it comes within a few centimeters of the initiator NFC device 102. The initiator NFC device 102 will then communicate with the target NFC device 104 in order to determine which signaling technologies can be used. In one case, the initiator NFC device 102 may be acting as a reader. In one example, a user may place a target NFC device 104 in the vicinity of the initiator NFC device 102 to initiate a payment transaction.

The initiator NFC device 102 may generate an RF field to communicate with the target NFC device 104. The initiator NFC device 102 may modulate the RF field to send a signal (e.g., data) to the target NFC device 104. Once the target NFC device 104 receives that signal, the initiator NFC device 102 may transmit a continuous wave to maintain the RF field. The continuous wave may have a carrier frequency. In the case of NFC, the carrier frequency may be 13.56 megahertz (MHz).

The target NFC device 104 may receive the RF field. The target NFC device 104 may respond by performing modulation on top of the continuous wave. The initiator NFC device 102 may receive the modulated signal and may try to decode it.

The target NFC device 104 may receive a signal 118 from the initiator NFC device 102. The signal 118 may be sent on a channel. The signal 118 may include data that is sent in one or more packets.

On the initiator NFC device 102 side, an information source 108 generates information bits (0, 1) and sends the information bits to a line coder 110. The line coder 110 may code the information bits. The line coder 110 may generate corresponding coded bits using an encoding mechanism. Examples of the coding mechanism include a non-return-to-zero (NRZ) coding mechanism, a Manchester coding mechanism and a modified-Miller coding mechanism.

The coded bits are then sent into a pulse shaping filter (PSF) 112. The PSF 112 generates a signal pulse or symbol for one or multiple coded bits. The modulator 114 modulates the signal symbols generated by the PSF 112. The transmit antenna 116 transmits the modulated signal symbols to the receiver 120 through the channel. The transmit antenna 116 may include a coil.

In one configuration, the receiver 120 of the target NFC device 104 includes a receive antenna 122, an envelope detector 124, a low pass filter (LPF) 126, an ADC 128, a slicer 130, an acquisition block 132, a time tracker block 134, the decoder 136 and an information bit sink 138. Certain elements/blocks may be removed from or additional elements/blocks may be added to the system 100 illustrated in FIG. 1. Furthermore, two or more elements/blocks may be combined into a single element/block, or a single element/block may be realized as multiple elements/blocks. For example, the antenna 122, the envelope detector 124, the LPF 126 and ADC 128 may be realized as a single element such as the receiver interface 140. Furthermore, one or both of the slicer 130 and the acquisition block 132 may be incorporated into the decoder 136.

The receive antenna 122 receives the modulated symbols sent by the initiator NFC device 102 through the channel. The receive antenna 122 may include a coil. In one configuration, the envelope detector 124 is disposed in an initial position in the receiver 120 signal processing flow. The envelope detector 124 may carry out demodulation of the modulated symbols received by the receiver antenna 122 and generate demodulated symbols.

The demodulated symbols are sent into the LPF 126. The LPF 126 may reduce carrier signal ripples and high frequency noise from the demodulated symbols. The carrier signal ripples may be made by a carrier which carries the modulated symbols and may cause bit errors on the decoder 136.

The demodulated symbols filtered by the LPF 126 are sent into the ADC 128. In one configuration, the ADC 128 is a multi-bit ADC and generates multi-bit output samples. In another configuration, the ADC 128 is a 1-bit ADC and generates 1-bit output per sample.

The output samples generated by the ADC 128 are sent into the slicer 130. The slicer 130 may also be referred to as an adaptive slicer or a quantizer. In one configuration, the slicer 130 includes a digital multiplexer. The slicer 130 generates a bit stream. The slicer 130 may convert the input sequence of M-bit samples into the output sequence of N-bit samples and remove a time-varying DC component from the input sequence. In one configuration, M and N are positive integer numbers, and M is greater than N. For example, M may be 3 or greater, and N may be 2 or 1.

In one configuration, the slicer 130 may convert an input sequence of at least 3-bit samples into an output sequence of 1-bit samples. The slicer 130 maps the output sequence of multi-bit samples into binary symbols. In another configuration, the slicer 130 may convert an input sequence of at least 3-bit samples into an output sequence of 2-bit samples.

The bit stream from the slicer 130 is sent into the acquisition block 132, the time tracker block 134 and the decoder 136. The acquisition block 132 acquires packets and initial symbol timing 146 (i.e., bit boundary information) from the bit stream. The bit boundary may be located between neighboring quarters of a bit stream (e.g., the last quarter of an information bit and the first quarter of the subsequent information bit) for the modified Miller code, and between neighboring halves of a bit stream for the Manchester code.

When a packet is acquired, the decoder 136 may be activated. The decoder 136 decodes information bits from the output from the slicer 130 and sends the decoded information bits to the sink 138. Since the acquisition block 132 and the decoder block 136 operate on binary symbols or symbols whose bit-width is at most two, they can be implemented with low hardware complexity, compared with the blocks operating on multi-bit ADC outputs (e.g., a 3-bit ADC or higher resolution ADCs).

In a typical implementation, the receiver 120 of the target NFC device 104 derives its clock using a phase-locked loop (PLL) based on the carrier generated by the transmitter 106 of the initiator NFC device 102. If the derived clock is accurate, the receiver clock and the transmitter clock are synchronized. Hence, the receiver 120 can determine bit boundaries (i.e., symbol timing 148) simply using a sample counter 142.

In reality, however, the derived clock may be inaccurate. For example, the PLL may suffer a cycle slip, especially if the modulated carrier has very low amplitude (as NFC uses amplitude modulation). Because the NFC type-A standard uses a modulation index of 90% to 100% for the 106 kbps mode, the cycle slip can happen easily. The cycle slip may lead to erroneous bit boundaries and erroneous decoding of packet data.

In one configuration, a 27.12 MHz digital clock for a modem of the target NFC device 104 may be derived from the carrier generated by an initiator using a phase locked loop (PLL) in a radio frequency analog (RFA) subsystem. It was observed that the digital clock frequency may be slightly higher (i.e., faster) than the ideal 27.12 MHz for a brief period depending on signal 118 strength, presence of overshoot in the receive antenna 122 output signal, coupling and distance between the initiator NFC device 102 and the target NFC device 104, etc. For long packets, the accumulated clock drift may become significantly large relative to the bit duration and lead to erroneous decoding.

In accordance with the present disclosure, a time tracking block (represented by the time tracker block 134 in FIG. 1) may be added to a receiver 120. In one implementation, the time tracker block 134 may be added to a digital modem. The time tracker block 134 may compute and provide symbol timing 148 to the decoder 136 based on the initial symbol timing 146 and the bit stream generated by the ADC 128 or the slicer 130. In one configuration, the symbol timing 148 is a series of bit boundaries.

The time tracker block 134 adjusts bit boundaries based on the output signal of the ADC 128 or the slicer 130. This relaxes requirements on the clock generation PLL (i.e., the clock generation PLL is allowed to introduce cycle slips). Benefits may be realized by the time tracker block 134 that tracks clock drift and adjusts bit boundaries used by the target decoder 136. There may be several advantages with such an approach. First, the time tracker block 134 may ensure that packets are decoded correctly, even for long packets, for which accumulated cycle slips may become huge. Second, analog circuits may be designed with less component cost. Third, analog circuits can be tuned (optimized for energy harvesting, for example) without worrying about cycle slips.

In accordance with the present disclosure, the time tracker block 134 can estimate bit boundary errors based on the output of the ADC 128 or the slicer 130, and adjust bit boundaries. The time tracker block 134 may analyze the signal 118 to estimate a symbol timing error 144. The time tracker block 134 may then adjust symbol timing 148 to correct for the symbol timing error 144.

In one configuration, the time tracker block 134 may estimate the symbol timing error 144 by comparing a location of a low-to-high or a high-to-low transition in the received signal 118 with an ideal location of a transition. For example, based on the initial symbol timing 146 from the acquisition block 132, the time tracker block 134 may determine the ideal location of a transition.

The time tracker block 134 may accumulate samples during different periods of a bit duration. For example, the time tracker block 134 may obtain samples of the bit stream output of the slicer 130. By comparing the samples to the ideal location of a transition, the time tracker block 134 may determine the symbol timing error 144.

The time tracker block 134 may adjust the symbol timing 148 by incrementing the initial symbol timing 146. In one configuration, the time tracker block 134 may adjust the symbol timing 148 by adding or subtracting the estimated symbol timing error 144 from a sample counter 142. In this configuration, the sample counter 142 may count the samples from the start of symbol (as indicated by the initial symbol timing 146, for instance). In another configuration, the time tracker block 134 may adjust the symbol timing 148 by incrementing initial symbol timing 146 by a fixed bit duration.

The time tracker block 134 may estimate the symbol timing error 144 and adjust the symbol timing 148 based on the NFC modulation types. As mentioned, there are three major modulation types in the NFC standards: type-A, type-B and type-F.

Type-A uses the modified-Miller code as a line code (i.e., baseband code). The code has a low-level period in (1) the first quarter of a bit duration, (2) the third quarter of a bit duration, or (3) none of a bit duration. By estimating the location of the low-level period for the (1) and (2) cases relative to the start of a bit duration, it may be possible to estimate the bit boundary error for the current bit and adjust the bit boundary of the following bit accordingly.

The basic idea of time tracking for NFC type-A is to monitor the location of a pause relative to the ideal location in a bit duration. Type-A uses three waveforms: bit 0A, bit 0B and bit 1. Bit 0A bears no information about clock drift because the waveform is a constant high-level. On the other hand, bit 0B has a pause during the first quarter (abbreviated to Q1), and bit 1 during the third quarter (abbreviated to Q3).

For NFC type-A, the time tracker block 134 may estimate the symbol timing error 144 by comparing a location of a pause in the received signal 118 with an ideal location of a pause corresponding to a decoded bit. The decoded bit may be received from the decoder 136 or may be decoded by the time tracker block 134 itself. The time tracker block 134 may adjust the symbol timing 148 by adding or subtracting the estimated symbol timing error 144 from the sample counter 142.

Type-B sends data in a chunk of 8 bits, called characters. Characters are separated by a random amount of time, which is called extra guard time in the standards. Hence, each character should be acquired separately. This implies that cycle slips can be accumulated only for 8-bit durations. For NFC type-B, the time tracker block 134 may estimate the symbol timing error 144 by detecting timing of a beginning of each character. In one approach, the time tracker block 134 may then adjust the symbol timing 148 by incrementing initial symbol timing 146 by a fixed bit duration. In another approach, the time tracker block 134 may compare a location of a low-to-high or high-to-low transition in the received signal 118 with an ideal location of a transition to estimate the symbol timing error 144. In this approach, the time tracker block 134 may then adjust the symbol timing 148 by adding or subtracting the estimated symbol timing error 144 from the sample counter 142.

It should be noted that for type-B, time tracking may not be needed if character acquisition is capable of providing symbol timing 148 with a fine resolution, rather than a coarse resolution of a bit duration, for example. In other words, type-B may not need time tracking because character acquisition may be designed such that it adjusts bit boundaries itself.

Type-F uses the Manchester code as a line code. In the Manchester code, there is a high-to-low transition or a low-to-high transition in every bit. By estimating the timing of a transition relative to the start of a bit duration, the time tracker block 134 can estimate bit boundary errors and adjust the bit boundary for the following bit accordingly.

For NFC type-F, the time tracker block 134 may estimate the symbol timing error 144 by comparing a location of a low-to-high or a high-to-low transition in a received signal 118 with an ideal location of a transition. The time tracker block 134 may adjust the symbol timing 148 by adding or subtracting the estimated symbol timing error 144 from the sample counter 142.

Figure 2:
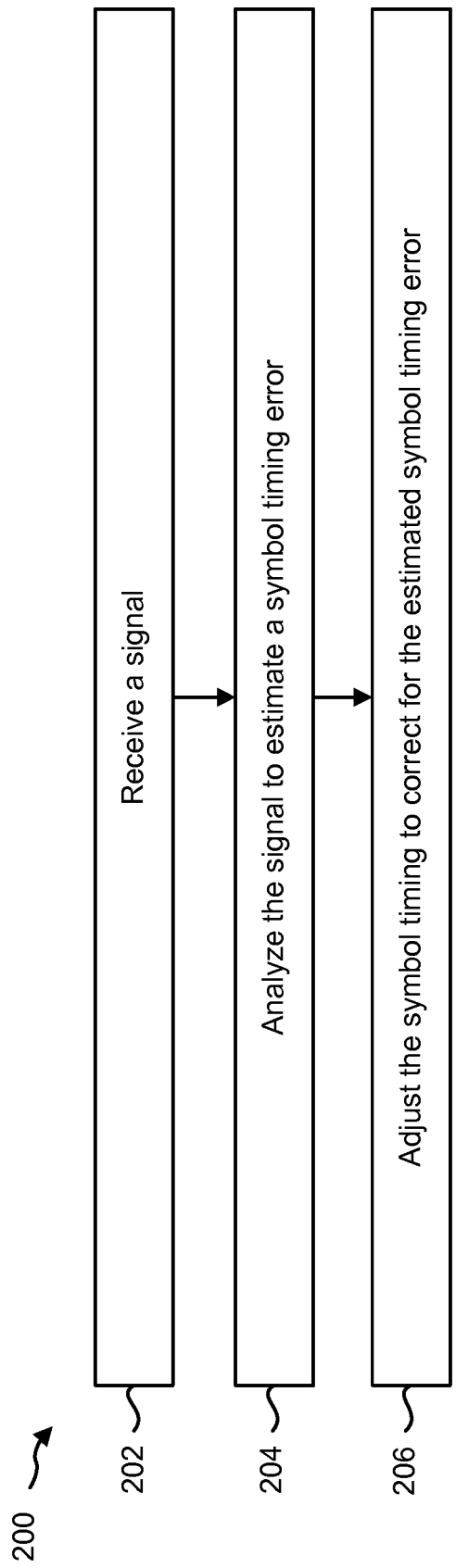
FIG. 2 is a flow diagram illustrating a method for timing recovery in NFC.

FIG. 2 is a flow diagram illustrating a method 200 for timing recovery in NFC. The method 200 may be performed by a target NFC device 104. The target NFC device 104 may receive 202 a signal 118 from an initiator NFC device 102. The received signal 118 may be modulated according to one of NFC type-A, type-B or type-F.

The target NFC device 104 may analyze 204 the signal 118 to estimate a symbol timing error 144. For example, the time tracker block 134 can estimate bit boundary errors based on the output of the ADC 128 or the slicer 130.

In one configuration, the target NFC device 104 may estimate the symbol timing error 144 by comparing a location of a low-to-high or a high-to-low transition in the received signal 118 with an ideal location of a transition. For example, based on initial symbol timing 146 provided by the acquisition block 132, the target NFC device 104 may determine the ideal location of a transition.

The target NFC device 104 may accumulate samples during different periods of a bit duration. For example, the target NFC device 104 may obtain samples of the bit stream output of the slicer 130. By comparing the samples to the ideal location of a transition, the target NFC device 104 may determine the symbol timing error 144.

The target NFC device 104 may adjust 206 symbol timing 148 to correct for the symbol timing error 144. The target NFC device 104 may adjust 206 the symbol timing 148 by incrementing the initial symbol timing 146.

In one configuration, the target NFC device 104 may adjust 206 the symbol timing 148 by adding or subtracting the estimated symbol timing error 144 from a sample counter 142. In this configuration, the sample counter 142 may count the samples from the start of symbol (as indicated by the initial symbol timing 146, for instance). In another configuration, the target NFC device 104 may adjust 206 the symbol timing 148 by incrementing initial symbol timing 146 by a fixed bit duration.

Figure 3:
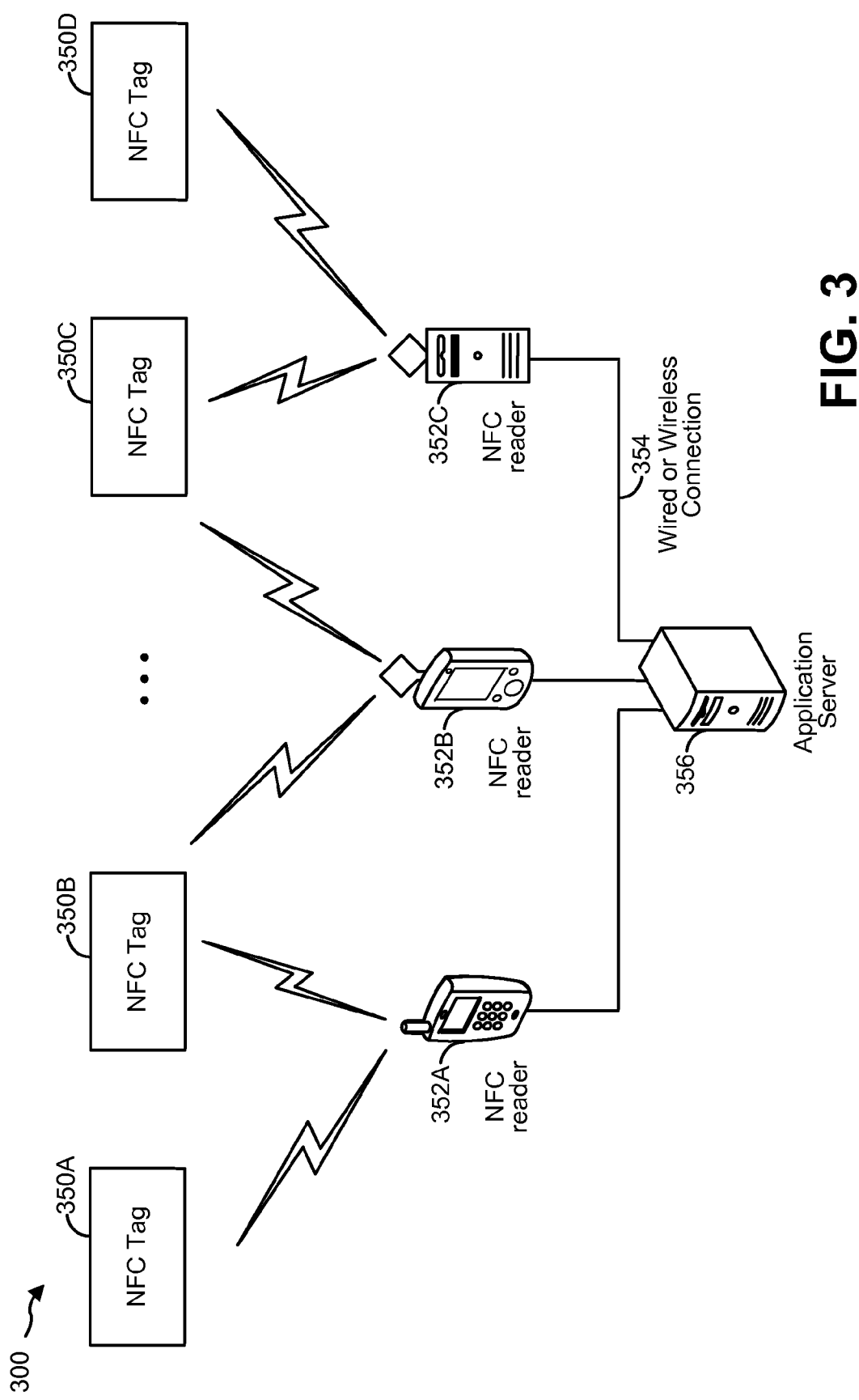
FIG. 3 is a block diagram illustrating an NFC system.

FIG. 3 is a block diagram illustrating an NFC system 300. The NFC system 300 includes a plurality of NFC tags 350A-350D, a plurality of NFC readers 352A-352C and an application server 356.

The NFC tags 350A-350D may each be associated with a particular object for a variety of purposes including, but not limited to, tracking inventory, tracking status, location determination and assembly progress. The NFC tags 350A-350D may be active devices that include internal power sources or passive devices that derive power from the NFC readers 352A-352C.

Although FIG. 3 shows only four NFC tags and three NFC readers, the present disclosure is not limited thereto. In one configuration, the NFC tags 350A-350D may be implemented in accordance with the target NFC device 104 described in connection with FIG. 1. In one configuration, the readers 352A-352C may be implemented in accordance with the initiator NFC device 102 described in connection with FIG. 1.

Each NFC reader 352A-352C wirelessly communicates data with one or more NFC tags 350A-350D within its coverage area. For example, the NFC tags 350A and 350B may be within a coverage area of the NFC reader 352A, the NFC tags 350B and 350C may be within a coverage area of the NFC reader 352B, and the NFC tags 350C and 350D may be within a coverage area of the NFC reader 352C. In one configuration, the RF communication mechanism between the NFC readers 352A-352C and the NFC tags 350A-350D is a backscatter technique. In this configuration, the NFC readers 352A-352C request data from the NFC tags 350A-350D via an RF signal, and the RF tags 350A-350D respond with the requested data by modulating and backscattering the RF signal provided by the NFC readers 352A-352C.

In another configuration, the RF communication mechanism is an inductance technique whereby the NFC readers 352A-352C magnetically couple to the NFC tags 350A-350D via an RF signal to access the data on the NFC tags 350A-350D. In either configuration, the NFC tags 350A-350D provide the requested data to the NFC readers 352A-352C on the same RF carrier frequency as the RF signal.

In this manner, the NFC readers 352A-352C collect data from each of the NFC tags 350A-350D within its coverage area. The collected data is then conveyed to the application server 356 via a wired or wireless connection 354 and/or via possible communication mechanism, for example, a peer-to-peer communication connection. In addition, and/or in the alternative, the application server 356 may provide data to one or more of the NFC tags 350A-350D via the associated NFC readers 352A-352C. Such downloaded information is application dependent and may vary greatly. Upon receiving the downloaded data, the NFC tag can store the data in a non-volatile memory therein.

In another configuration, the NFC readers 352A-352C may optionally communicate data on a peer-to-peer basis such that each NFC reader does not need a separate wired or wireless connection 354 to the application server 356. For example, the NFC reader 352A and the NFC reader 352B may communicate on a peer-to-peer basis utilizing a back scatter technique, a WLAN technique, and/or any other wireless communication technique. In this instance, the NFC reader 352B may not include a wired or wireless connection 354 to the application server 356. In configurations in which communications between the NFC reader 352A-352C and the application server 356 are conveyed through the wired or wireless connection 354, the wired or wireless connection 354 may utilize any one of a plurality of wired standards (e.g., Ethernet and fire wire) and/or wireless communication standards (e.g., IEEE 802.11x and Bluetooth).

As one of ordinary skill in the art will appreciate, the NFC system of FIG. 3 may be expanded to include a multitude of NFC readers 352A-352C distributed throughout a desired location (for example, a building or office site) where the NFC tags may be associated with equipment, inventory and/or personnel. In addition, it should be noted that the application server 356 may be coupled to another server and/or network connection to provide wide area network coverage.

Figure 4:
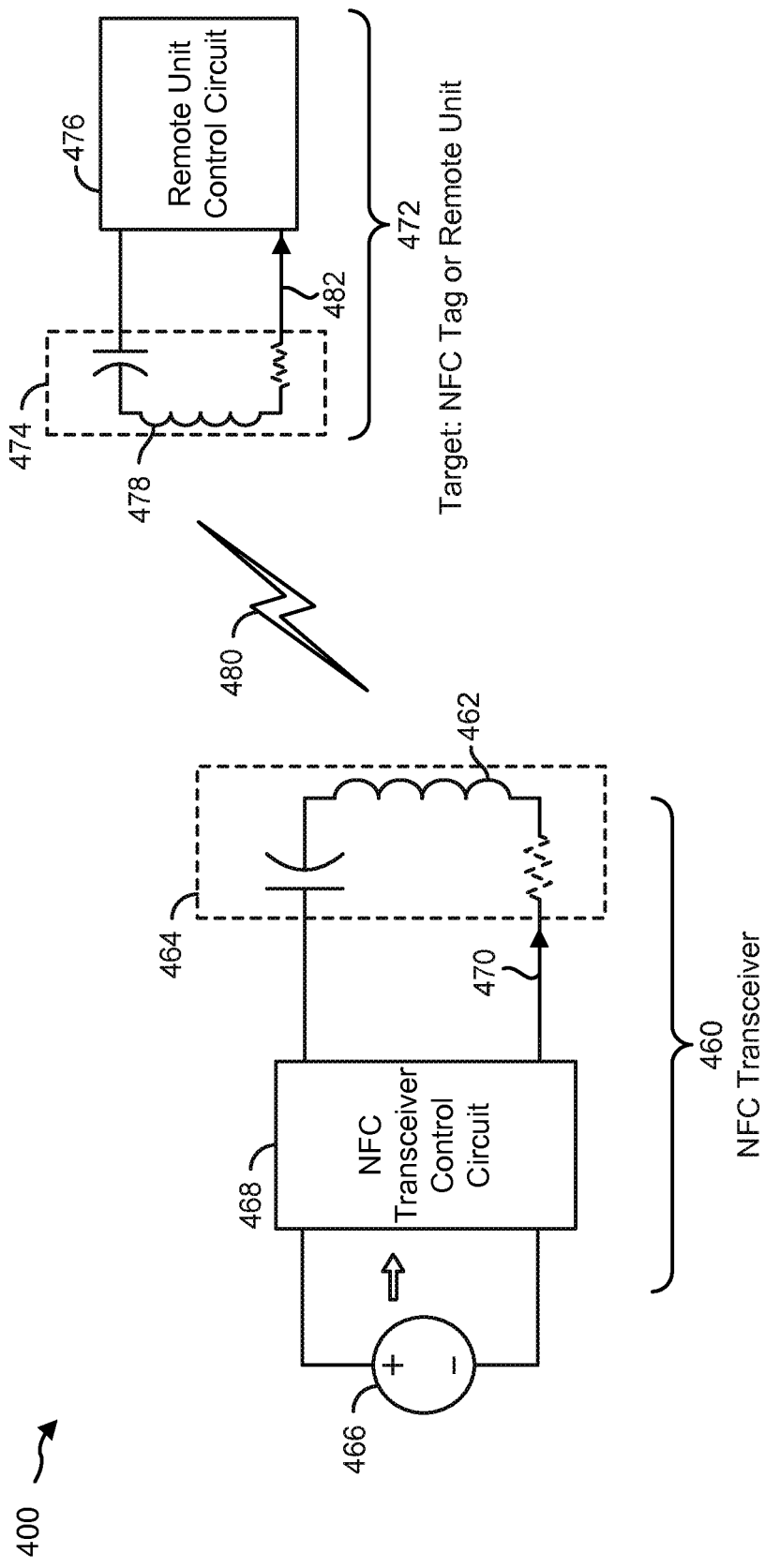
FIG. 4 is a block diagram illustrating an exemplary schematic of an NFC system including a transceiver and a remote unit.

FIG. 4 is a block diagram illustrating an exemplary schematic of an NFC system 400 including a transceiver and a remote unit. The NFC system 400 includes an NFC transceiver 460 and a remote unit 472 such as an NFC tag. The NFC transceiver 460 may include a voltage power source 466, an NFC transceiver control circuit 468 and a transmitter circuit 464. The NFC transceiver control circuit 468 is powered by the voltage source 466, and connected to one or more transceiver loops 462.

The transceiver loops 462 are hereinafter interchangeably used with coils or loop antennae. The coils and loop antenna may be made of conductive material, for example, an electromagnetic coil, through which an alternating current (AC) 470 can flow. The transceiver loops 462 may be circular, oval, and the like, although other sizes and shapes are possible. The AC current 470 flowing through the transceiver loops 462 can result in transmitting magnetic energy or magnetic flux 480 at various frequencies (e.g., about 100 kHz to about 40 MHz). The wavelength of the emitted frequencies may be much longer than the size of loops 462 on the NFC transceiver 460.

The remote unit 472 includes a receiver circuit 474 and a remote unit control circuit 476. If the remote unit 472 is close enough to the NFC transceiver 460, the magnetic flux 480 from the transceiver 460 can get AC coupled onto one or more remote unit loops 478 of conductive material, which can be an unpowered device (i.e., without a battery or other means of applying continuous power) having the electromagnetic coil and remote unit control circuit 476. An oscillating AC current 482 flowing in alternating directions in the remote unit control circuit 476 can be rectified by a rectifying diode in the remote unit control circuit 476, which can cause a voltage to be built up across a bypass capacitor in the remote unit control circuit 476. Once the bypass capacitor has built up a sufficient voltage, the remote unit control circuit 476 can become powered up and operational. By receiving coupled and modulated AC signal from the NFC transceiver 460, the remote unit 472 can receive and detect information (e.g., commands) from the NFC transceiver 460.

Once operational, the remote unit control circuit 476 may also send signals back to the NFC transceiver 460 by changing the impedance seen by the remote unit loops 478. This can be accomplished by shunting or opening the remote unit loops 478 with, for example, a switch. If the remote unit 472 is close enough to the NFC transceiver 460, the modulated electromagnetic field generated by the remote unit loops 478 in the remote unit 472 can be coupled back onto the reader loops 462 of the NFC transceiver 460. The signals sent back to the NFC transceiver 460 can be slow and on the order of 100 bits of data, and provide information back to the transceiver 460 such as the serial number or model number of the device to which the remote unit 472 is attached, credit card number, personal identification information, security codes and passwords, and the like.

Figure 5:
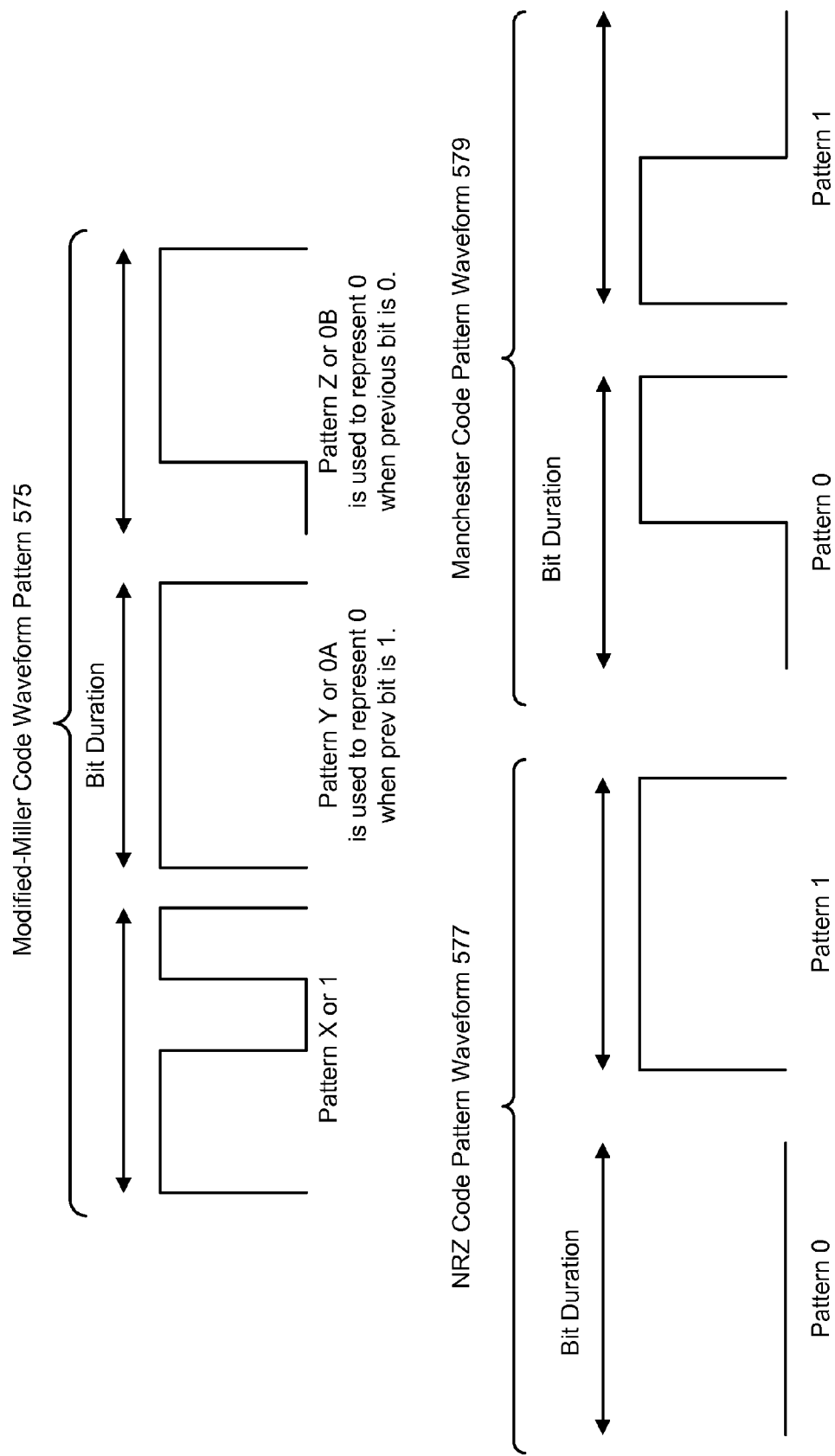
FIG. 5 illustrates an exemplary diagram of a modified-Miller code pattern, an NRZ (non-return-to-zero) code pattern and a Manchester code pattern.

FIG. 5 illustrates an exemplary diagram of a modified-Miller code pattern, an NRZ (non-return-to-zero) code pattern and a Manchester code pattern. NRZ and Manchester codes are relatively straightforward compared to a modified-Miller code. Three waveform patterns are illustrated in FIG. 5. Waveform pattern 575 represents a modified-Miller code for type-A. Waveform pattern 577 represents an NRZ code for type-B. Waveform pattern 579 represents a Manchester code for type-F. Pattern 1 is generally used to represent bit 1. Pattern 0 is used to represent bit 0 for type-B and type-F. For type-A, the pattern for bit 0 is either pattern 0A or 0B, depending on the previous bit. If the previous bit is 1, then pattern 0A is used to transmit bit 0; otherwise, pattern 0B is used.

The NFC protocol poses a few unique challenges to wireless communication. First, the signal amplitude of NFC may be severely distorted by an RF subsystem. This is because the signal dynamic range of NFC may be relatively large at a receive antenna 122. As such, a conventional automatic gain control (AGC) may not perform well for NFC. Second, an NFC type-B signal may contain a long sequence of high level (or low level) values, which makes the traditional DC offset cancellation technique impracticable or unworkable.

In one configuration, signal amplitude is extracted in the RF subsystem and fed to an analog-to-digital converter (ADC) 128, followed by operations by the acquisition block 132 and decoder block 136 on multi-bit ADC output samples. A time tracker block 134 may estimate the symbol timing error 144 and adjust the symbol timing 148. The decoder block 136 could be implemented by applying a plurality of matched filters (e.g., two matched filters, one for Pattern 0 and the other for Pattern 1, when decoding Manchester-coded signal) to ADC output after removing direct current (DC) components.

Another configuration performs slicing (by a slicer 130, for example) in the RF subsystem and runs the acquisition block 132, time tracking block 134 and decoder block 136 on a single-bit slicer output. In this context, slicing may refer to converting an input sequence of M-bit samples into an output sequence of N-bit samples (where M and N are positive integer numbers) and removing a time-varying DC component from the input sequence. The decoder block 136 could be implemented using binary matched filtering (meaning input and filter coefficients are binary symbols).

Figure 6:
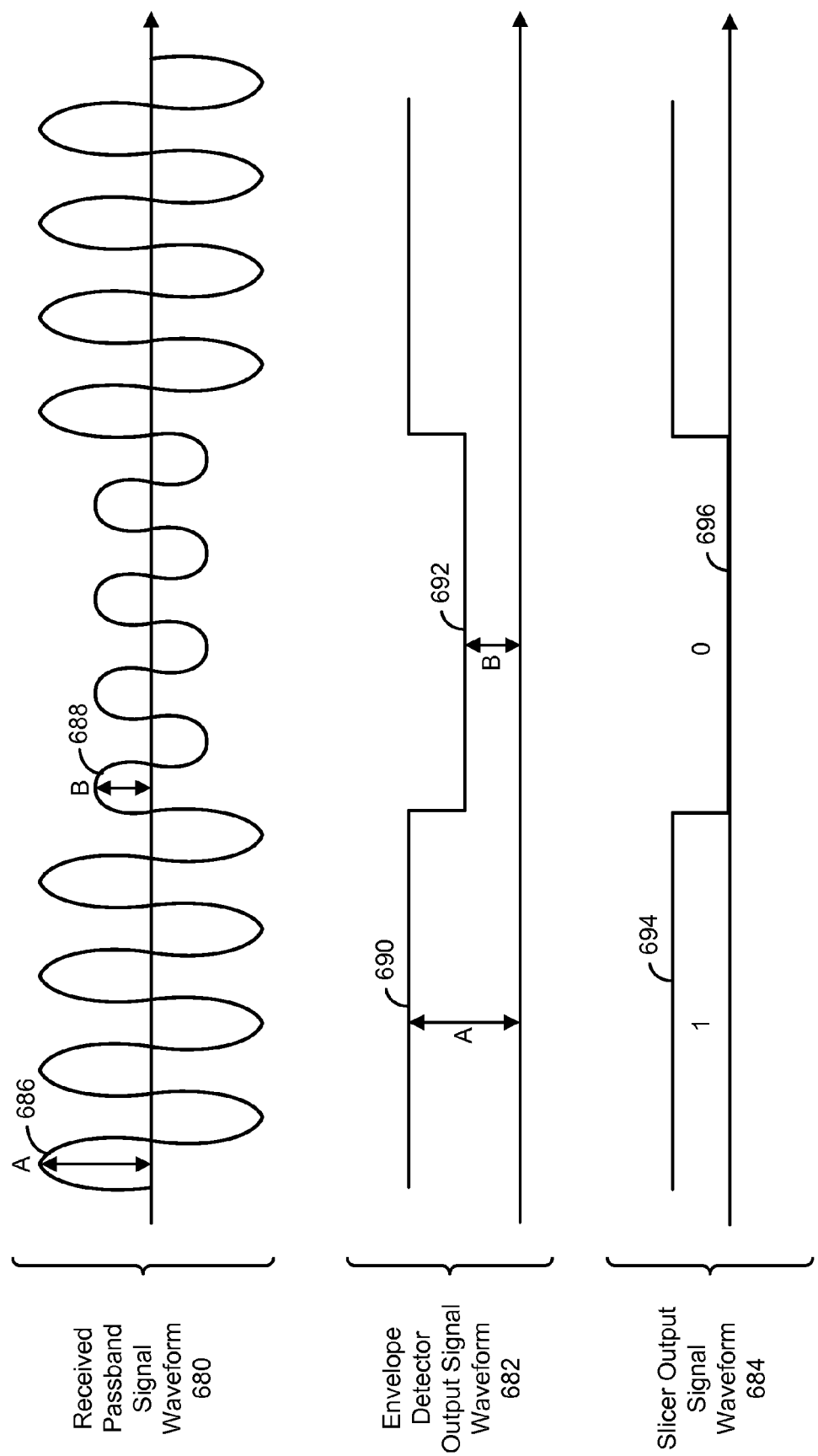
FIG. 6 illustrates examples of signal waveforms that are processed inside the NFC receiver of FIG. 1.

FIG. 6 illustrates examples of signal waveforms that are processed inside the NFC receiver 106 of FIG. 1. The signal waveforms include a received passband signal waveform 680, an envelope detector output signal waveform 682, and a slicer output signal waveform 684.

The received passband signal waveform 680 may indicate the modulated symbols received and outputted by the receive antenna 122. As shown in FIG. 6, the received passband signal waveform 680 includes at least two symbols: the high amplitude symbol 686 (denoted as "A") and low amplitude symbol 688 (denoted as "B").

The envelope detector output signal waveform 682 is the corresponding output from the envelope detector 124 as shown in FIG. 1. The envelope detector output signal waveform 682 includes at least two demodulated symbols 690 and 692 corresponding to the symbols 686 and 688, respectively.

The slicer output signal waveform 684 denotes the corresponding output from the slicer 130. The slicer output signal waveform 684 includes at least two symbols (or bits) 694 and 696 (denoted as "1" and "0") corresponding to the symbols 690 and 692, respectively. The slicer output signal waveform 684 is sent to the acquisition block 132, the time tracker block 134 and the decoder 136. The time tracker block 134 may estimate the symbol timing error 144 and adjust the symbol timing 148 based on the slicer output signal waveform 684.

Figure 7:
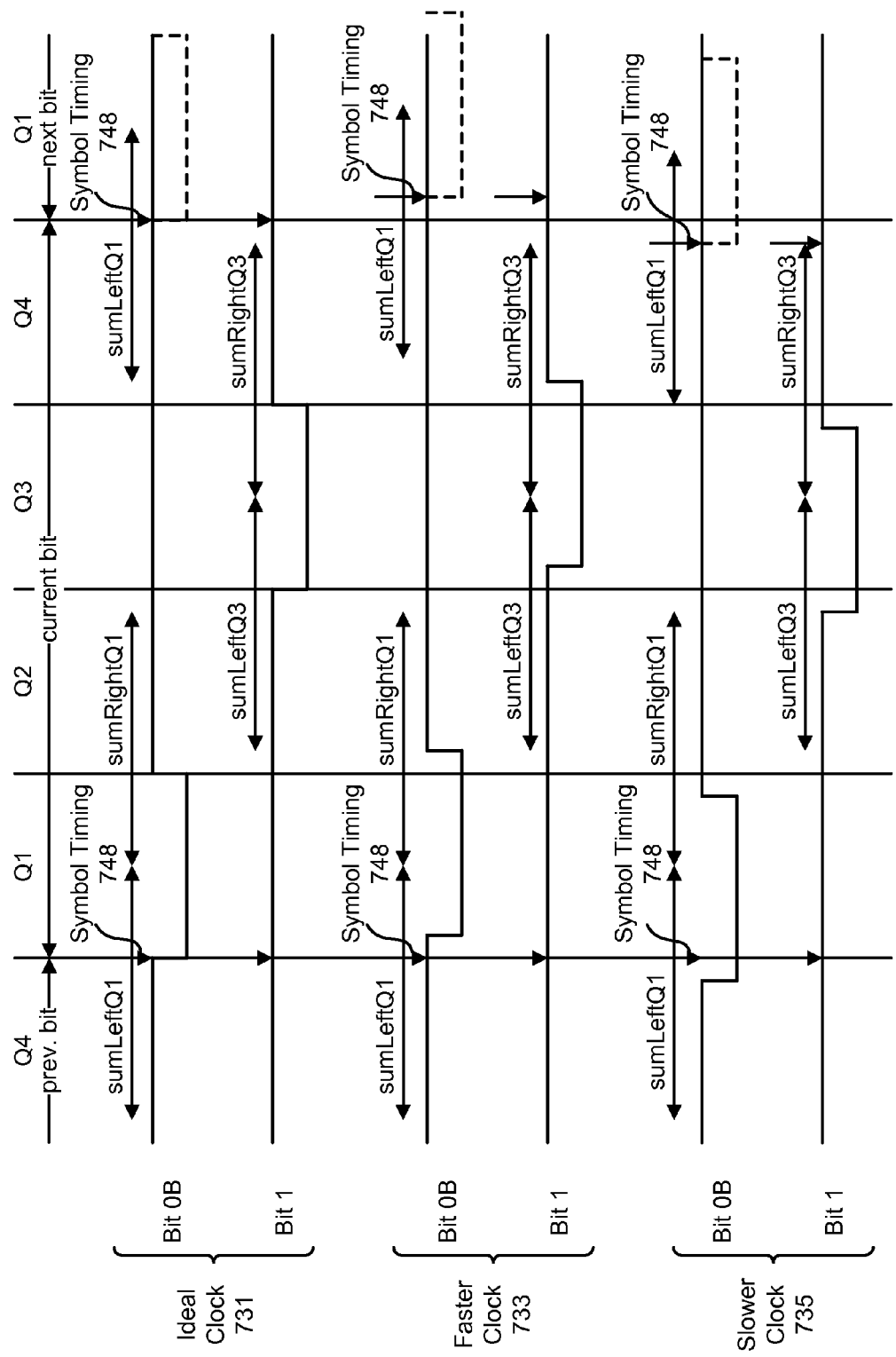
FIG. 7 is a block diagram illustrating symbol timing for NFC type-A.

FIG. 7 is a block diagram illustrating symbol timing 748 for NFC type-A. Specifically, FIG. 7 illustrates the slicer 130 output observed by the time tracker block 134, the sum of the left side and the right side of a pause, and symbol timing 148 when the modem clock is an ideal clock 731, a faster clock 733, or a slower clock 735. FIG. 7 shows that the difference between the sum of the left side of a pause and the sum of the right side of a pause is proportional to the timing offset of the current bit.

In NFC type-A, a bit may be split into four quarters. Therefore, a bit may have a first quarter (Q1), a second quarter (Q2) a third quarter (Q3) and a fourth quarter (Q4).

For bit 0B, the sum of the left-side of a pause is denoted by sumLeftQ1 (the sum of the right-aligned portion of Q4 plus the sum of the first half of Q1) and the sum of the right-side of a pause by sumRightQ1 (sum of the left-aligned portion of Q2 plus sum of the other half of Q1). The difference is defined as diff=sumLeftQ1−sumRightQ1.

Similarly, for bit 1, the difference is defined as diff=sumLeftQ3−sumRightQ3. From this example, it is observable that: diff is zero for the ideal clock 731 case; the next symbol timing 148 pulse should occur after 256 cycles (for 106 kbps packets assuming sampling rate is 27.12 MHz) from the previous pulse.

For the faster clock 733 case, diff is positive and is twice the timing offset. The next symbol timing 148 pulse should occur after 256+0.5*diff cycles from the previous pulse.

For the slower clock 735 case, diff is negative and is twice the timing offset. The next symbol timing 148 pulse should occur after 256+0.5*diff cycles from the previous pulse.

As described above, symbol timing 148 pulses may be generated at the desired timing by subtracting 0.5*diff from a sample counter 142 at the moment of correction/adjustment and by generating symbol timing 148 pulses when the sample counter 142 reaches 0, assuming a modulo-256 counter 142 (for 106 kbps packets). The following discussion illustrates the timing at which a sample counter 142 should be adjusted. Note that a target decoder 136 can generate a decoded bit after Q3 because Q4 is irrelevant for decoding.

Figure 8:
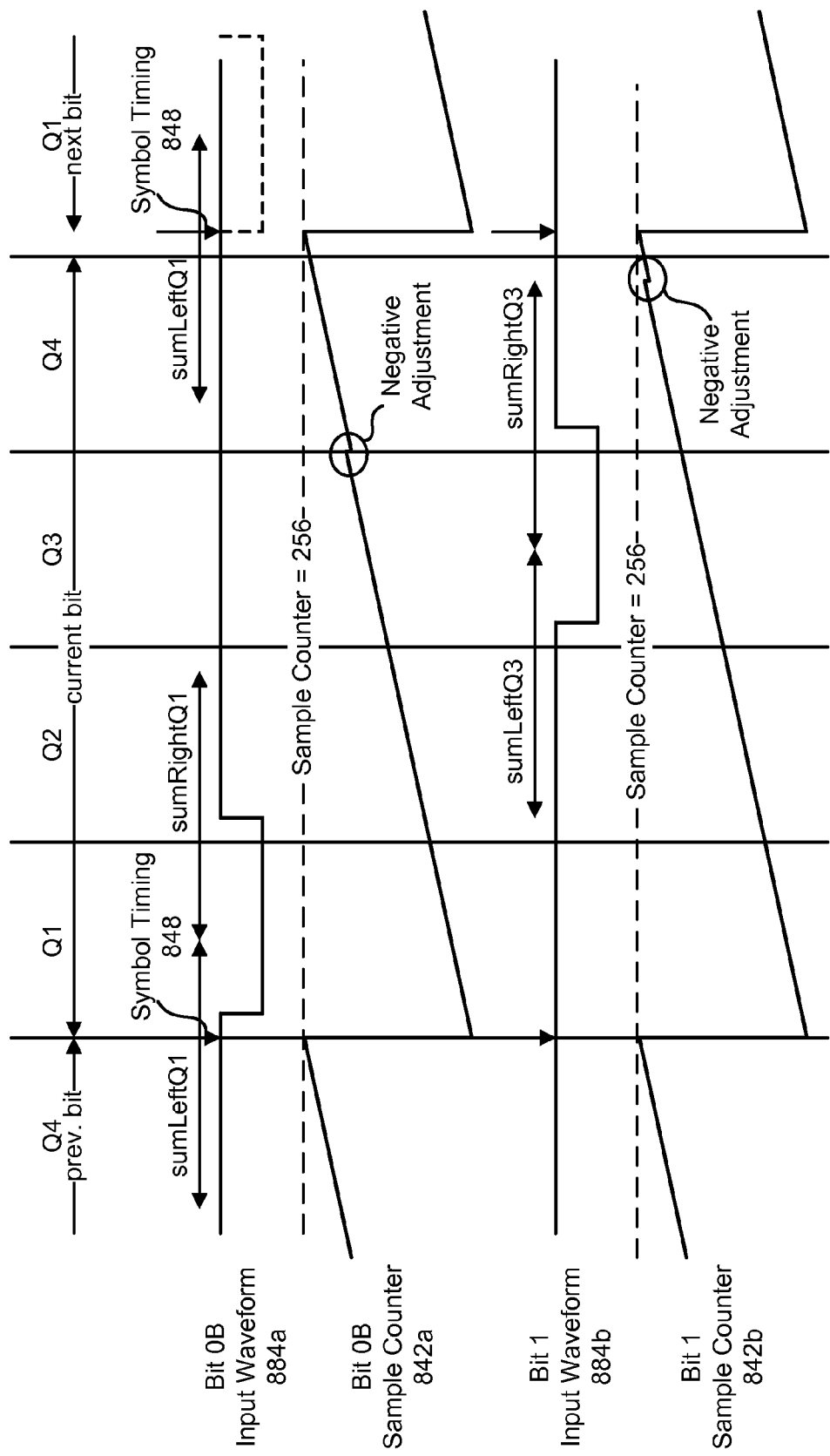
FIG. 8 illustrates the adjustment timing and the behavior of a sample counter for the faster clock case for NFC type-A.

FIG. 8 illustrates the adjustment timing and the behavior of a sample counter 142 for the faster clock 733 case for NFC type-A. The symbol timing 848 for a bit 0B input waveform 884a is shown with a corresponding sample counter 842a. Similarly, the symbol timing 848 for a bit 1 input waveform 884b is shown with a corresponding sample counter 842b. Depending on the decoded bit, a sample counter 842 may be adjusted as follows.

If the decoded bit corresponds to bit 0A (i.e., the current decoded bit is zero and the previous decoded bit is one), then the time tracker block 134 does not make any adjustment. If the decoded bit corresponds to bit 0B (i.e., the current decoded bit is zero and the previous decoded bit is also zero), then the time tracker block 134 applies the timing adjustment (−0.5*diff, as determined according to FIG. 7) to the sample counter 142 at the end of Q3. In the case of a faster clock 733, there is a negative adjustment in the sample counter 142 because diff is positive.

If the decoded bit corresponds to bit 1, then the time tracker block 134 applies the timing adjustment (−0.5*diff) to the sample counter 142 at the end of the accumulation period for sumRightQ3.

Figure 9:
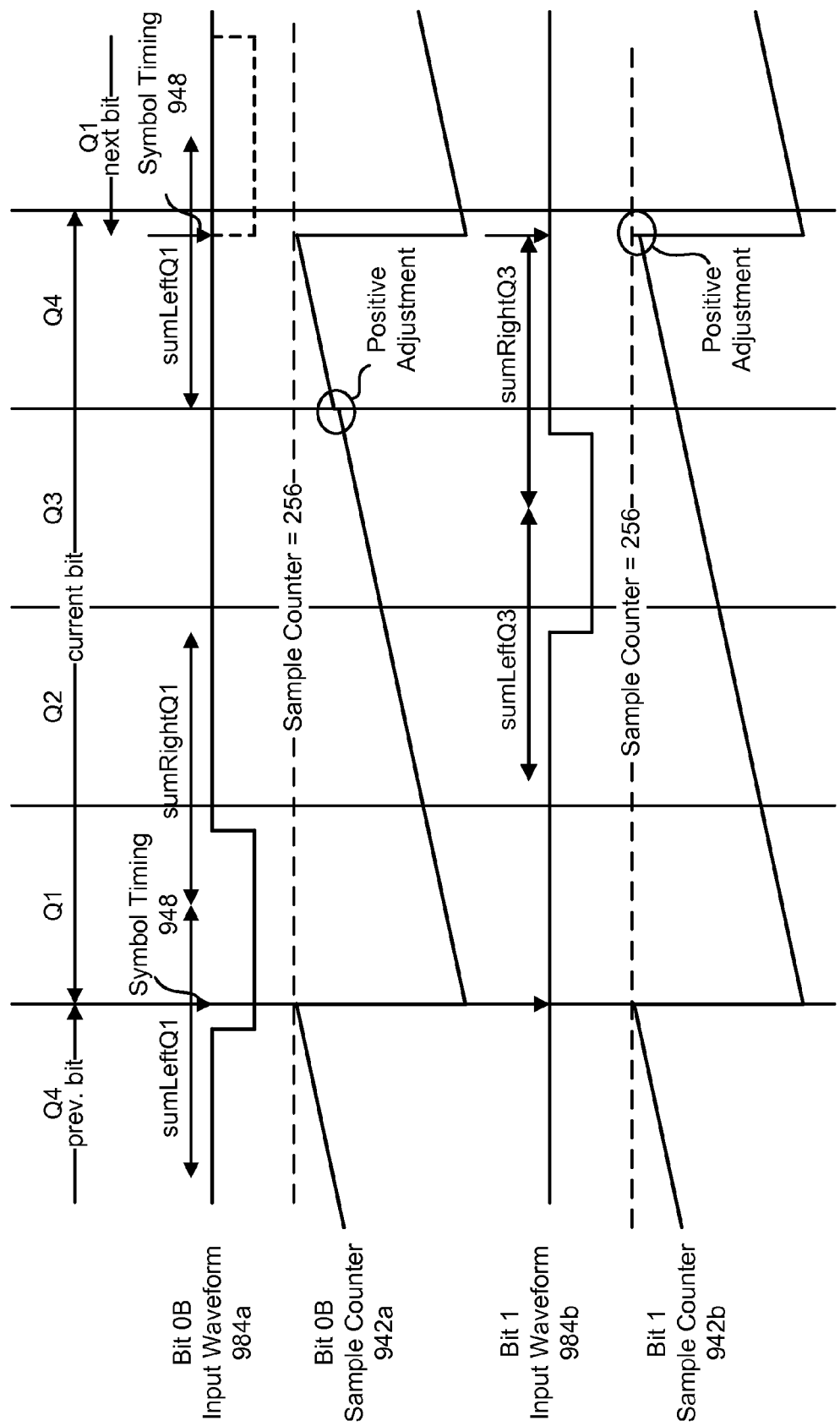
FIG. 9 illustrates the adjustment timing and the behavior of a sample counter for the slower clock case for NFC type-A.

FIG. 9 illustrates the adjustment timing and the behavior of a sample counter 142 for the slower clock 735 case for NFC type-A. The symbol timing 948 for a bit 0B input waveform 984a is shown with a corresponding sample counter 942a. Similarly, the symbol timing 948 for a bit 1 input waveform 984b is shown with a corresponding sample counter 942b. Depending on the decoded bit, a sample counter 942 may be adjusted as follows. Depending on the decoded bit, a sample counter 942 may be adjusted as follows.

If the decoded bit corresponds to bit 0A (i.e., the current decoded bit is zero and the previous decoded bit is one), then the time tracker block 134 does not make any adjustment. If the decoded bit corresponds to bit 0B (i.e., the current decoded bit is zero and the previous decoded bit is also zero), then the time tracker block 134 applies the timing adjustment (−0.5*diff, as determined according to FIG. 7) to the sample counter 142 at the end of Q3. In the case of a slower clock 735, there is a positive adjustment in the sample counter 142 because diff is negative.

If the decoded bit corresponds to bit 1, then the time tracker block 134 applies the timing adjustment (−0.5*diff) to the sample counter 142 at the end of the accumulation period for sumRightQ3.

Figure 10:
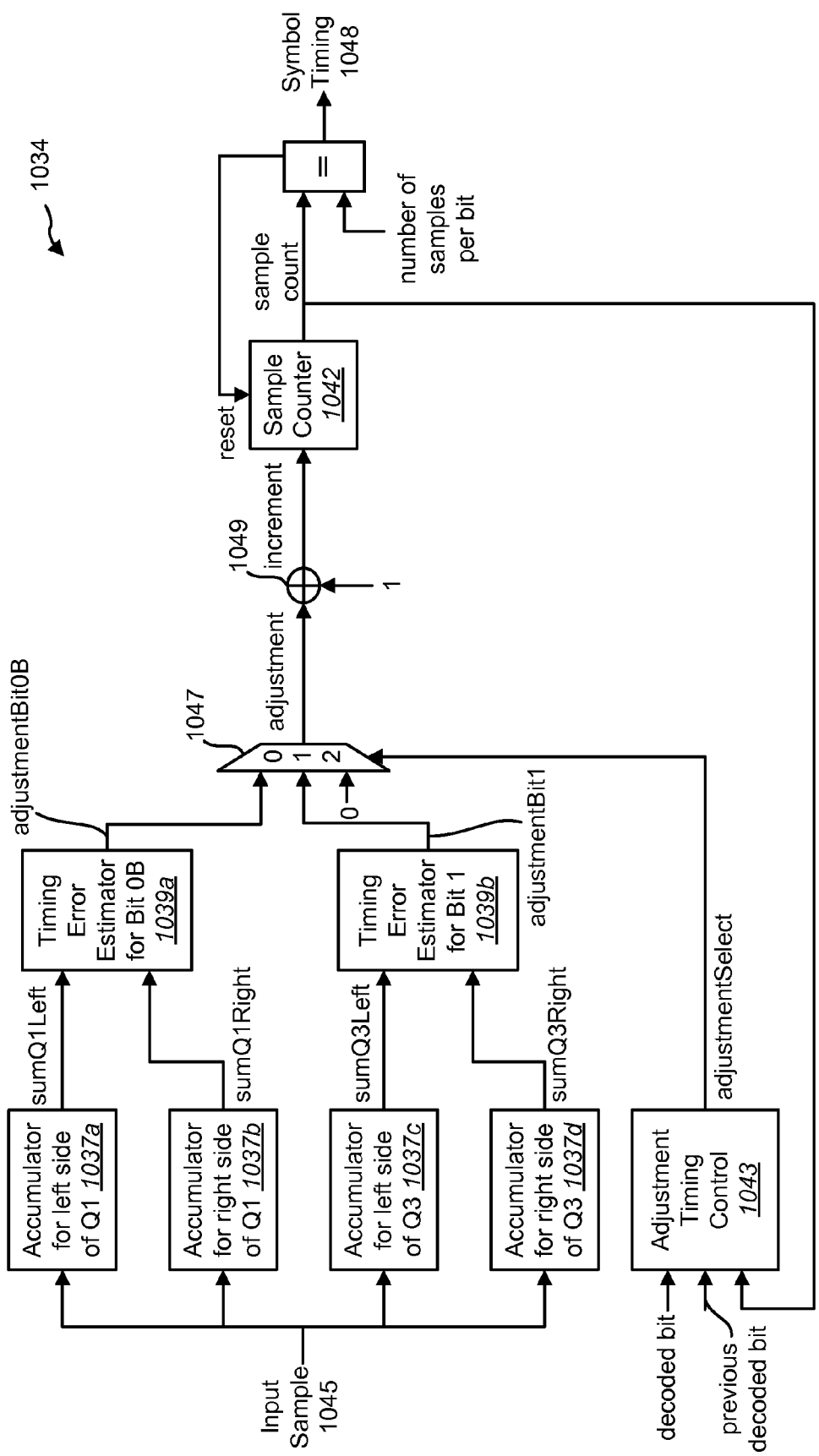
FIG. 10 is a block diagram illustrating a configuration of a time tracker block when modulation is performed in accordance with NFC type-A.

FIG. 10 is a block diagram illustrating a configuration of a time tracker block 1034 when modulation is performed in accordance with NFC type-A. In this configuration, the type-A time tracker block 1034 includes four accumulators 1037a-d, two timing error estimators 1039a-b, a sample counter 1042 and an adjustment timing control block 1043.

The accumulator 1037a (whose output is denoted by sumQ1Left) accumulates a subset of input samples 1045 on the left-side of the center of the first quarter of a bit duration. The accumulator 1037b (whose output is denoted by sumQ1Right) accumulates a subset of input samples 1045 on the right-side of the center of the first quarter of a bit duration, and similarly for the other two accumulators 1037c-d whose output is denoted by sumQ3Left and sumQ3Right.

The pair of sumQ1Left and sumQ1Right is coupled to the timing error estimator 1039a for bit 0B block, which may compute and output the adjustment for the sample count (denoted by adjustmentBit0B) using a formula adjustmentBit0B=(sumQ1Right−sumQ1Left)/2 followed by the rounding to the nearest integer operation. Similarly, the pair of sumQ3Left and sumQ3Right is coupled to the timing error estimator 1039b for bit 1 block, which may compute and output the adjustment for the sample count (denoted by adjustmentBit1) using a formula adjustmentBit1=(sumQ3Right−sumQ3Left)/2 followed by the rounding to the nearest integer operation. The adjustmentBit0B and adjustmentBit1 may be constrained to a specified range (not shown in the block diagram).

Depending on the adjustmentSelect signal generated by the adjustment timing control block 1043, one of the three values (adjustmentBit0B, adjustmentBit1 and zero) is selected by a multiplexer 1047. The output of the multiplexer 1047 is added by one by the adder 1049 to produce the increment signal.

The sample counter 1042 increments the sample count at each clock cycle using the increment signal as the (variable) increment step size. The sample counter 1042 is reset every time the sample count exceeds the number of samples per bit. The symbol timing 1048 signal has the value of one when the sample count is equal to the number of samples per bit, and the value of zero otherwise.

The adjustment timing control block 1043 is coupled to the decoded bit and the previous decoded bit, which may be generated by a decoder 136. The output of the adjustment timing control block 1043, denoted by adjustmentSelect, controls the source and timing of the adjustment for the increment step size of the sample counter 1042.

The adjustmentSelect signal may be generated as follows. In a first case, it may be set to zero if the sample count equals 0.75*the number of samples per bit, the decoded bit is zero, and the previous decoded bit is also zero. In a second case, it may be set to one if the sample count equals the last sample index of the accumulation period for sumQ3Right, and the decoded bit is one. In a third case, it may be set to two if neither of the above two conditions is satisfied.

In this configuration, a decoder 136 should complete and provide the decoded bit to the time tracker block 1034 at the end of the third quarter of a bit duration, which is possible because the fourth quarter is not needed in decoding.

Figure 11:
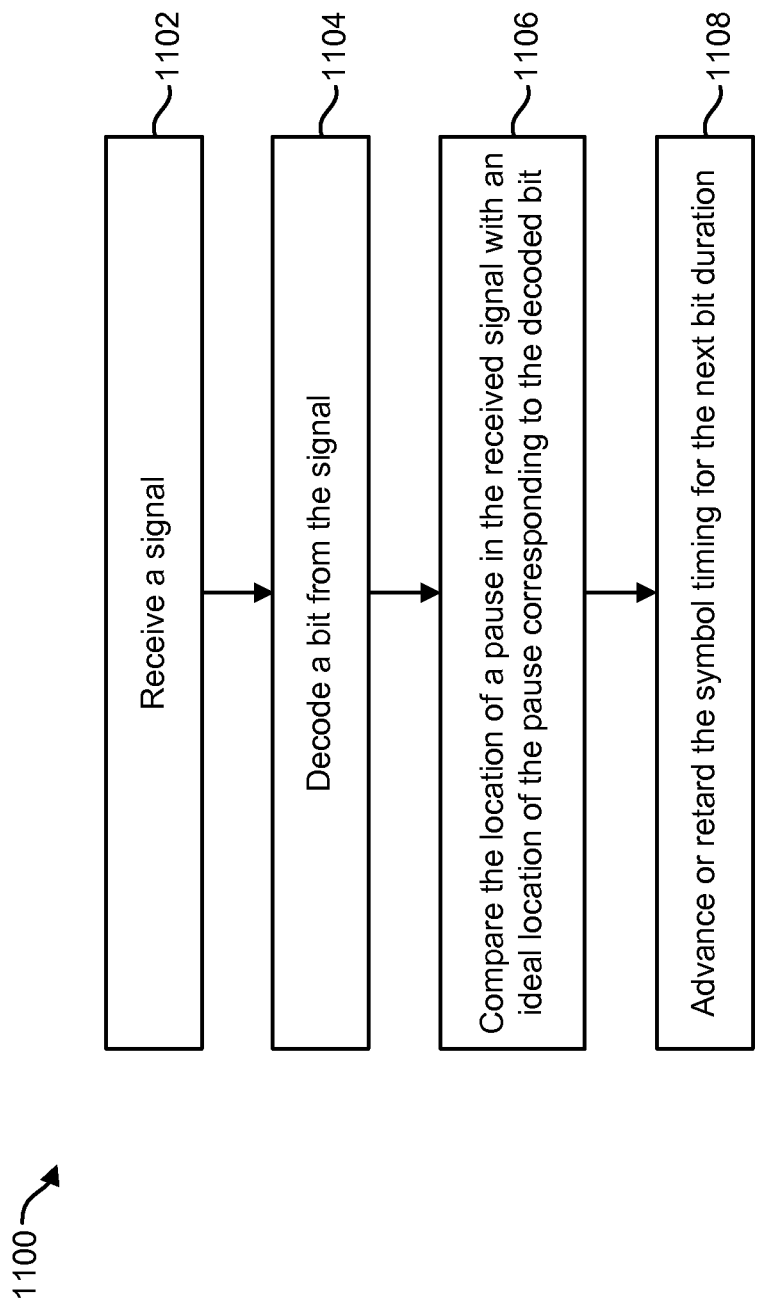
FIG. 11 is a flow diagram illustrating one possible method for estimating symbol timing error where modulation is performed in accordance with NFC type-A.

FIG. 11 is a flow diagram illustrating one possible method 1100 for estimating symbol timing error 144 where modulation is performed in accordance with NFC type-A. The method 1100 may be performed by a target NFC device 104. The target NFC device 104 may receive 1102 a signal 118 from an initiator NFC device 102. The received signal 118 may be modulated according to NFC type-A.

The target NFC device 104 may decode 1104 a bit from the signal 118. For example, a decoder 136 may decode the bit in a bit stream. The target NFC device 104 may feed back the decoded bit to the time tracker 134. Alternatively, the time tracker 134 may perform decoding itself.

The target NFC device 104 may compare 1106 the location of a pause (i.e., a modulated portion of a bit) in the received signal 118 with the ideal location of a pause corresponding to the decoded bit. The difference of the two is the (estimated) symbol timing error 144.

The symbol timing 148 for the next bit duration may be advanced or retarded 1108 by, for example, adding or subtracting the symbol timing error 144 to/from a sample counter 142. For example, a sample counter 142 may count from 0 to N (e.g., 128). When it reaches N, indicating a bit boundary, the counter 142 may reset to 0 and count from 0 to N again. Adding or subtracting the symbol timing error 144 to/from the sample counter 142 causes the counter 142 to reach N later or earlier.

Figure 12:
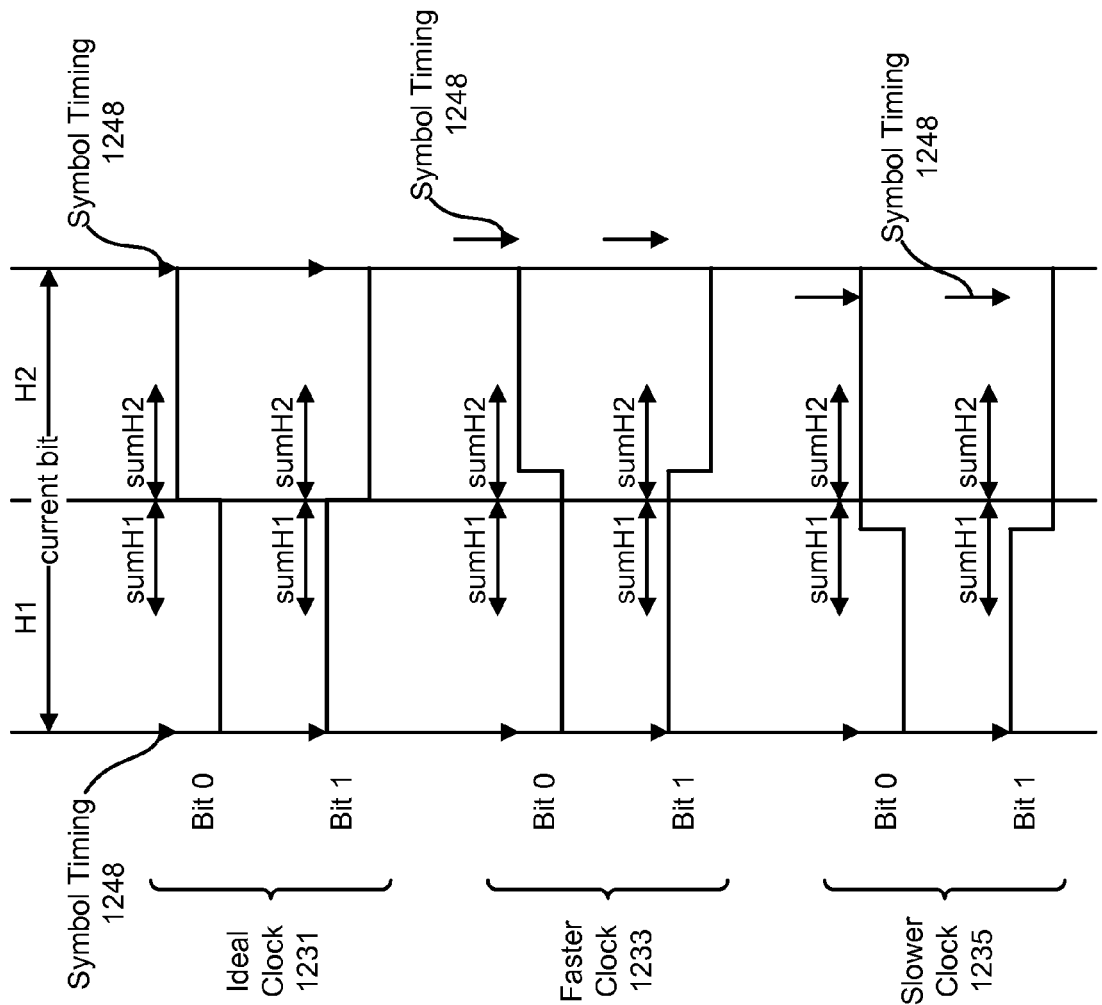
FIG. 12 is a block diagram illustrating symbol timing for NFC type-F.

FIG. 12 is a block diagram illustrating symbol timing 1248 for NFC type-F. Manchester coding used in type-F packets ensures that there is a low-to-high or high-to-low transition in the middle of a packet. Time tracking may be performed by monitoring the timing of a transition. In FIG. 12, the current bit is depicted with a first half (H1) and a second half (H2).

It can be difficult to recognize an actual low-to-high (or high-to-low) transition from a false low-to-high (or high-to-low) transition created by noise. Rather than making a sample-by-sample comparison to determine a transition, a certain number of samples may be accumulated around the ideal transition point. This is designated in FIG. 12 by sumH1 and sumH2. The timing of a transition can be estimated by comparing the sum of the first half, denoted by sumH1, and the sum of the second half, denoted by sumH2. FIG. 12 illustrates that a timing offset is related to sumH1 and sumH2 as follows.

In the ideal clock 1231 case, sumH1+sumH2=accum_length. In this case, accum_length is the accumulation duration each for sumH1 and sumH2.

In the faster clock 1233 case (i.e., positive timing offset), the timing offset=sumH1−(accum_length−sumH2) if sumH1 is greater than or equal to sumH2. Otherwise, timing offset=(accum_length−sumH1)−sumH2 if sumH1 is less than sumH2.

In the slower clock 1235 case (i.e., negative timing offset), the timing offset=sumH1−(accum_length−sumH2) if sumH1 is greater than or equal to sumH2. Otherwise, timing offset=(accum_length−sumH1)−sumH2 if sumH1 is less than sumH2.

The above relations may be expressed according to equation (1).

$$\text{timing offset} = \begin{cases} sumH1 + sumH2 - \text{accum\_length}, & \text{if } sumH1 \geq sumH2 \\ -(sumH1 + sumH2 - \text{accum\_length}), & \text{if } sumH1 < sumH2 \end{cases} \quad (1)$$

Figure 13:
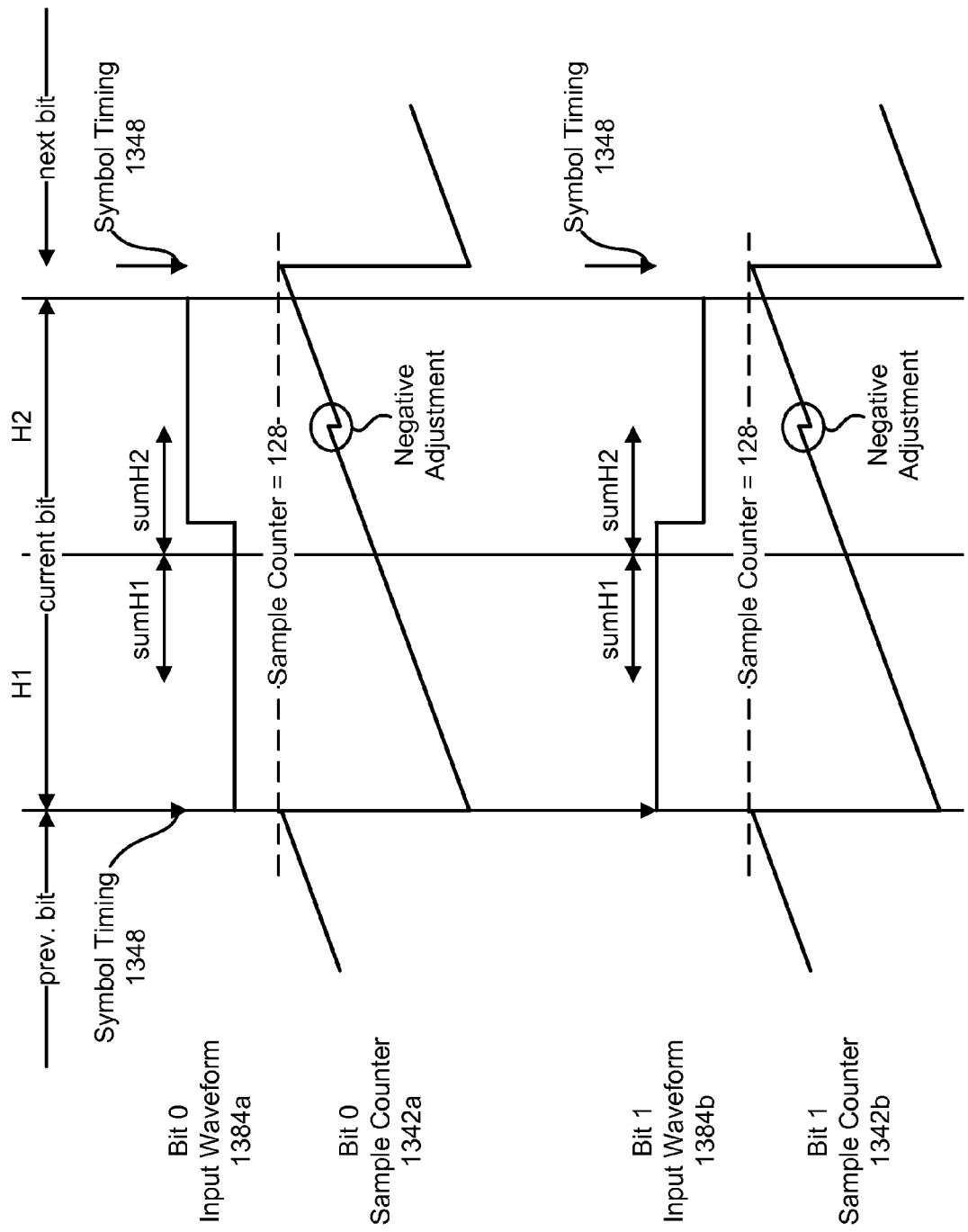
FIG. 13 illustrates the behavior of the sample counter and symbol timing in the faster clock case for NFC type-F.

FIG. 13 illustrates the behavior of the sample counter 1342 and symbol timing 1348 in the faster clock 1233 case for NFC type-F. The symbol timing 1348 for a bit 0B input waveform 1384a is shown with a corresponding sample counter 1342a. Similarly, the symbol timing 1348 for a bit 1 input waveform 1384b is shown with a corresponding sample counter 1342b.

The estimated timing offset may be compensated for by subtracting the timing offset from a sample counter 1342 at the end of the sumH2 accumulation period. More specifically, a sample counter 1342 may be set to the previous count value −timing offset +1, where the timing offset has been provided in equation (1). The adjustment to the sample counter 1342 adjusts the timing of the next symbol timing 1348 pulse.

In this example, the sample counter 1342 counts from 0 to 128. In the faster clock 1233 case, the timing offset is positive. Therefore, time tracker block 134 may produce a negative adjustment by subtracting the timing offset from the sample counter 1342 at the end of the sumH2 accumulation period.

Figure 14:
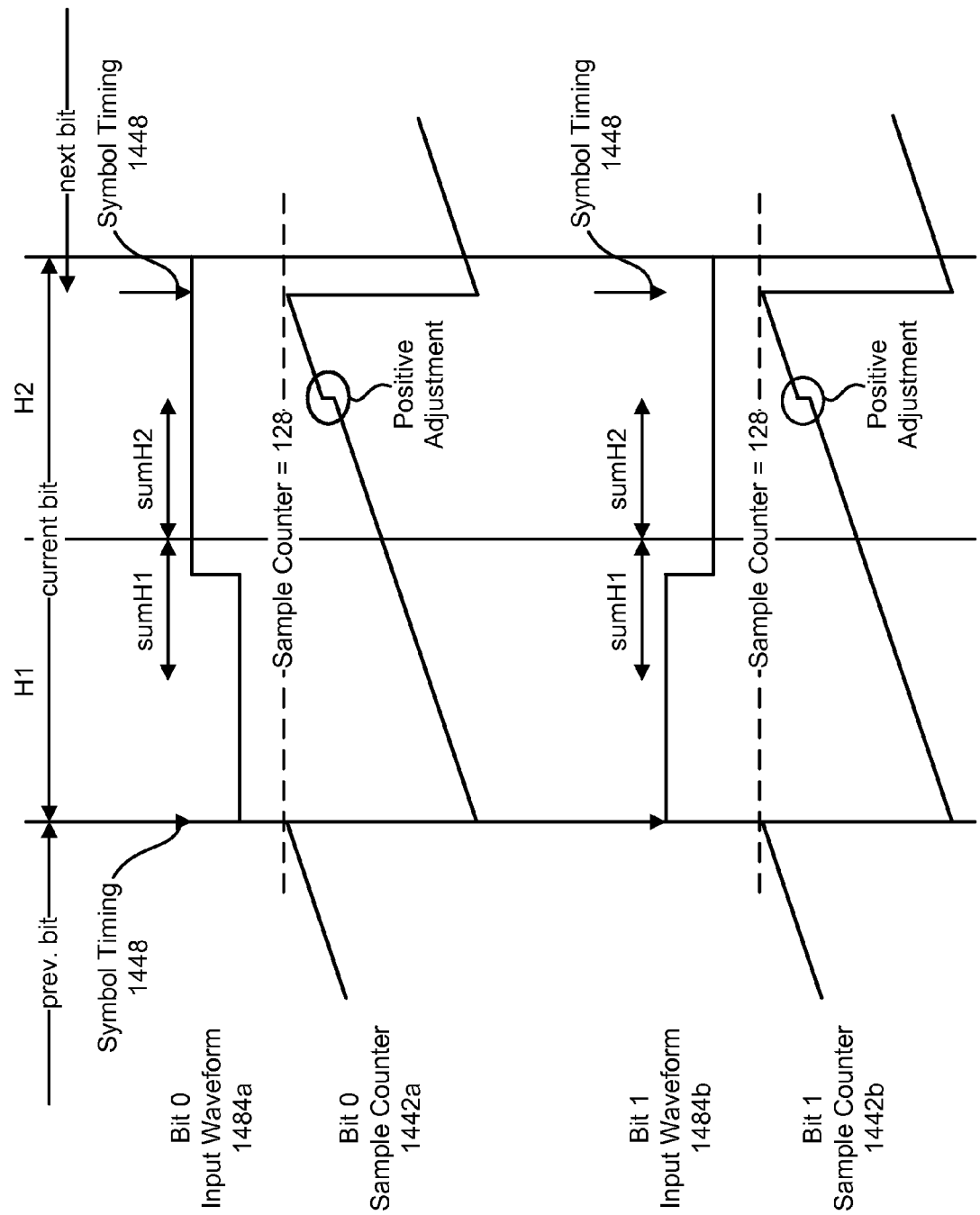
FIG. 14 illustrates the behavior of the sample counter and symbol timing in the slower clock case for NFC type-F.

FIG. 14 illustrates the behavior of the sample counter 1442 and symbol timing 1448 in the slower clock 1235 case for NFC type-F. The symbol timing 1448 for a bit 0 input waveform 1484a is shown with a corresponding sample counter 1442a. Similarly, the symbol timing 1448 for a bit 1 input waveform 1484b is shown with a corresponding sample counter 1442b.

As described above, the estimated timing offset may be compensated for by subtracting the timing offset from a sample counter 1442 at the end of the sumH2 accumulation period. More specifically, a sample counter 1442 may be set to the previous count value−timing offset+1, where the timing offset has been provided in equation (1). The adjustment to the sample counter 1442 adjusts the timing of the next symbol timing 1448 pulse.

In this example, the sample counter 1442 counts from 0 to 128. In the slower clock 1235 case, the timing offset is negative. Therefore, time tracker block 134 may produce a positive adjustment by subtracting the timing offset to the sample counter 1442 at the end of the sumH2 accumulation period.

Figure 15:
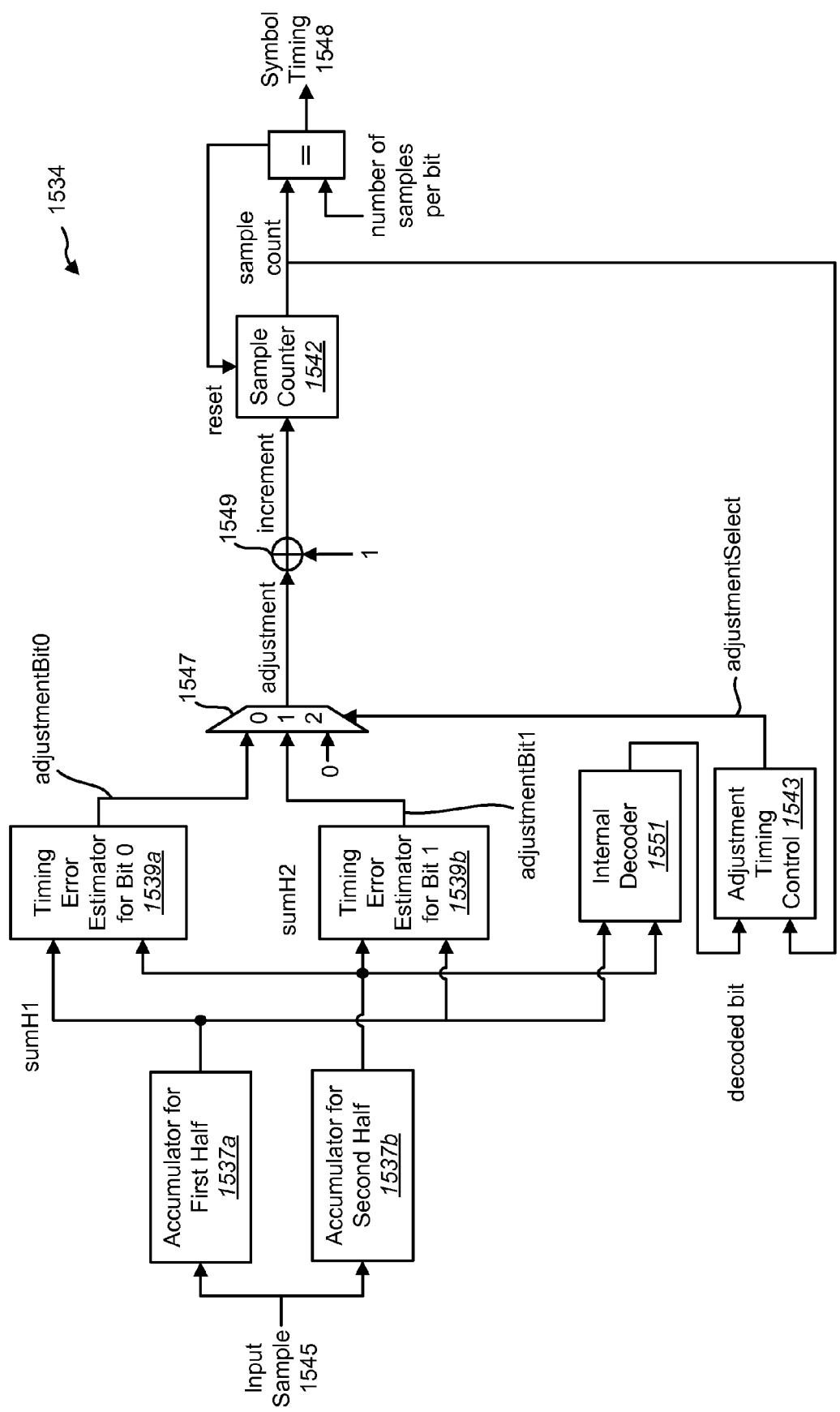
FIG. 15 is a block diagram illustrating a configuration of a time tracker block when modulation is performed in accordance with NFC type-F.

FIG. 15 is a block diagram illustrating a configuration of a time tracker block 1534 when modulation is performed in accordance with NFC type-F. In this configuration, the type-F time tracker block 1534 includes two accumulators 1537*a-b*, two timing error estimators 1539*a-b*, a sample counter 1542, an internal decoder 1551 and an adjustment timing control block 1543.

The accumulator 1537*a* (whose output is denoted by sumH1) accumulates a subset of input samples 1545 on the left-side of the center of a bit duration. The accumulator 1537*b* (whose output is denoted by sumH2) accumulates a subset of input samples 1545 on the right-side of the center of a bit duration.

The pair of sumH1 and sumH2 is coupled to the timing error estimators 1539*a-b* and the internal decoder 1551. The timing error estimator 1539*a* for bit 0 block may compute and output the adjustment for the sample count (denoted by adjustmentBit0) using a formula adjustmentBit0=sumH1+sumH2−N, where N denotes the accumulation duration for each accumulator 1537. Similarly, the timing error estimator 1539*b* for bit 1 block may compute and output the adjustment for the sample count (denoted by adjustmentBit1) using a formula adjustmentBit1=N−sumH1−sumH2. The adjustmentBit0 and adjustmentBit1 may be constrained to a specified range (not shown in the block diagram).

Depending on the adjusmentSelect signal generated by the adjustment timing control block 1543, one of the three values (adjustmentBit0, adjustmentBit1 and zero) is selected by a multiplexer 1547. The output of the multiplexer 1547 is added by one by the adder 1549 to produce the increment signal.

The sample counter 1542 increments the sample count at each clock cycle using the increment signal as the (variable) increment step size. The sample counter 142 is reset every time the sample count is equal to the number of samples per bit. The symbol timing 1548 signal has the value of one when the sample count is equal to the number of samples per bit, and the value of zero otherwise.

The pair of sumH1 and sumH2 may also be coupled to the internal decoder 1551. The internal decoder 1551 may output the decoded bit using a formula, decoded bit=0 if sumH1<=sumH2 and decoded bit=1 if sumH1>sumH2.

The decoded bit and the sample count may be coupled to the input of the adjustment timing control block 1543, which controls the source and timing of the adjustment for the increment step size of the sample counter 1542.

The adjustmentSelect signal may be generated as follows. In a first case, it may be set to zero if the sample count equals the last sample index of the accumulation period for sumH2, and the decoded bit is zero. In a second case, it may be set to one if the sample count equals the last sample index of the accumulation period for sumH2, and the decoded bit is one. In a third case, it may be set to two if neither of the above two conditions is satisfied.

In this configuration, the internal decoder 1551 must complete and provide the decoded bit to the adjustment timing control block 1543 at the end of the accumulation period for sumH2.

Figure 16:
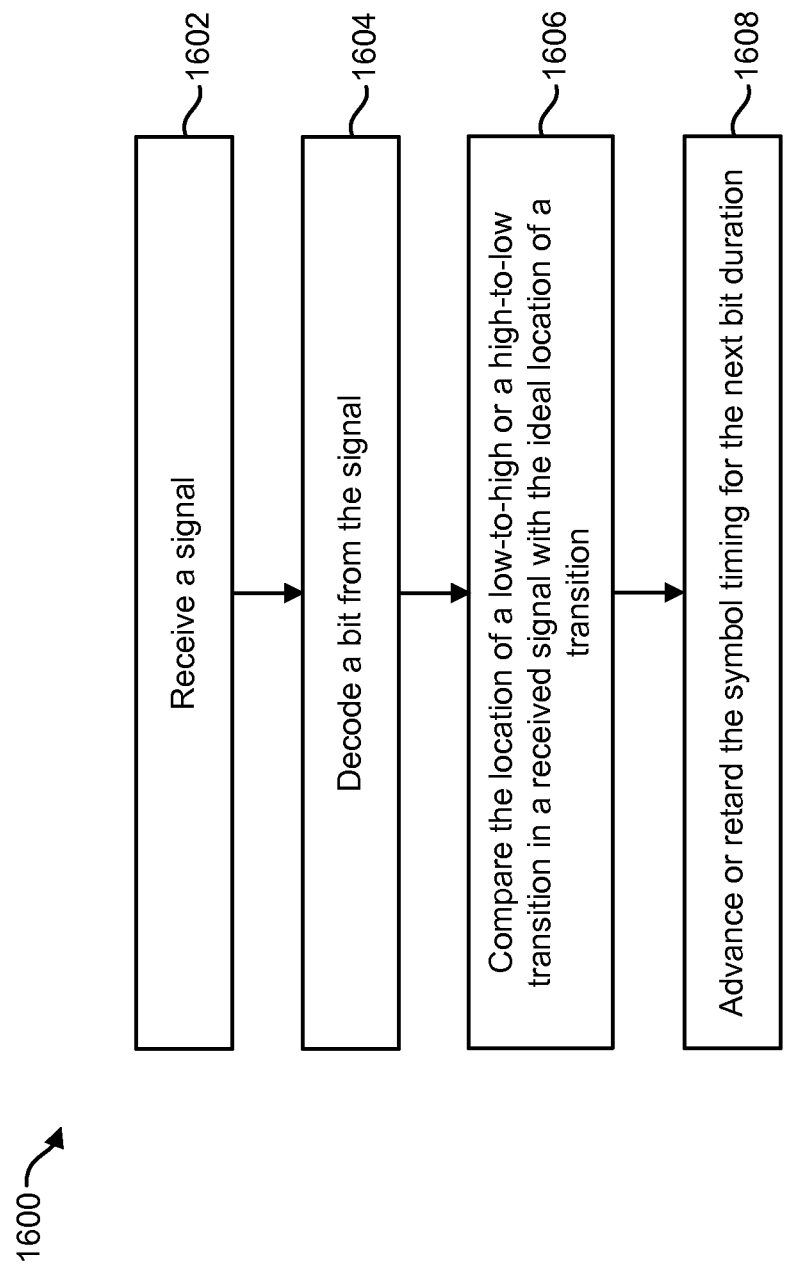
FIG. 16 is a flow diagram illustrating one possible method for estimating symbol timing error where modulation is performed in accordance with NFC type-F.

FIG. 16 is a flow diagram illustrating one possible method 1600 for estimating symbol timing error 144 where modulation is performed in accordance with NFC type-F. The method 1600 may be performed by a target NFC device 104. The target NFC device 104 may receive 1602 a signal 118 from an initiator NFC device 102. The received signal 118 may be modulated according to NFC type-F.

The target NFC device 104 may decode 1604 a bit from the signal 118. For example, a decoder 136 may decode the bit in a bit stream. The target NFC device 104 may feed back the decoded bit to the time tracker 134. Alternatively, the time tracker 134 may perform decoding itself.

The target NFC device 104 may compare 1606 the location of a low-to-high or a high-to-low transition in the received signal 118 with the ideal location of a transition, which is the center of a bit duration. (Please refer to FIG. 12 for an example of an ideal clock 1231, a faster clock 1233, and a slower clock 1235.) The difference of the two is the (estimated) symbol timing error 144.

Regarding step 1606, it can be difficult to recognize an actual low-to-high (or high-to-low) transition from a false low-to-high (or high-to-low) transition created by noise. Rather than making a sample-by-sample comparison, a certain number of samples may be accumulated around the ideal transition point. This is designated by sumH1 and sumH2 (which are shown in FIG. 12 and which were discussed previously). The comparison of a low-to-high or a high-to-low transition in a received signal 118 with the ideal location of a transition (step 1606) may be performed by comparing sumH1 and sumH2 (see equation (1) discussed above).

The symbol timing 148 for the next bit duration may be advanced or retarded 1608. For example, the target NFC device 104 may add or subtract the symbol timing error 144 to/from a sample counter 142.

Figure 17:
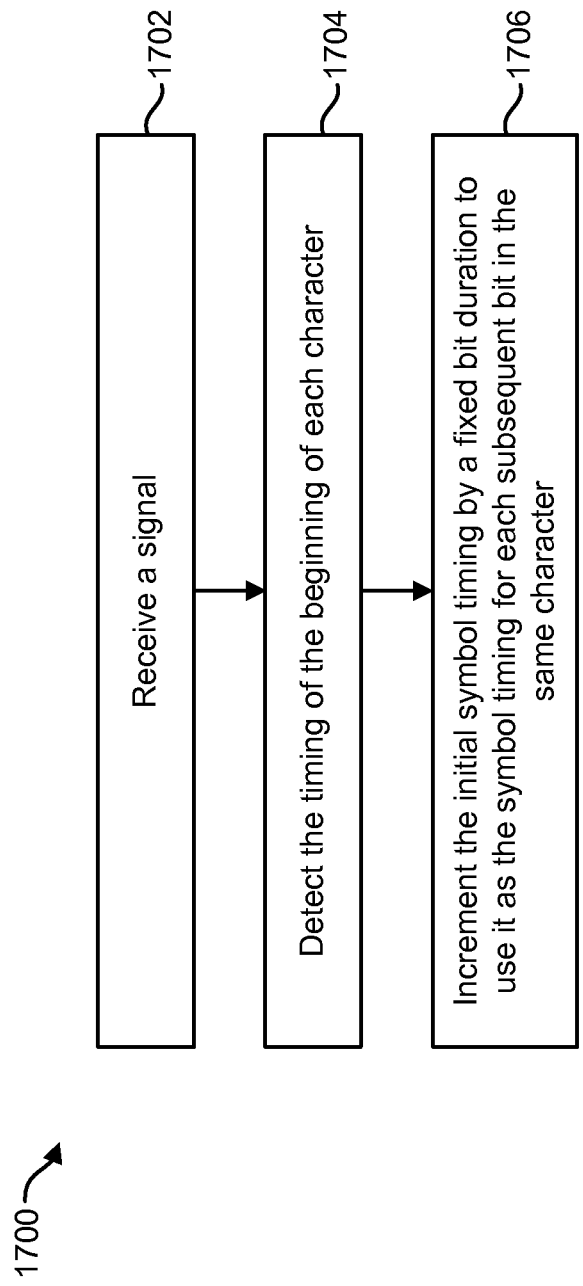
FIG. 17 is a flow diagram illustrating one possible method for estimating symbol timing error where modulation is performed in accordance with NFC type-B.

FIG. 17 is a flow diagram illustrating one possible method 1700 for estimating symbol timing error 144 where modulation is performed in accordance with NFC type-B. The method 1700 may be performed by a target NFC device 104. The target NFC device 104 may receive 1702 a signal 118 from an initiator NFC device 102. The received signal 118 may be modulated according to NFC type-B.

The target NFC device 104 may detect 1704 the timing of each character. For example, an acquisition block 132 may detect 1704 the beginning of each character. Each character may include 10 bits: one bit indicating the start of a character, eight information bits, and one bit indicating the end of a character.

The initial symbol timing 146 may be incremented 1706 by a (fixed) bit duration to use it as the symbol timing 148 for each subsequent bit in the same character.

Figure 18:
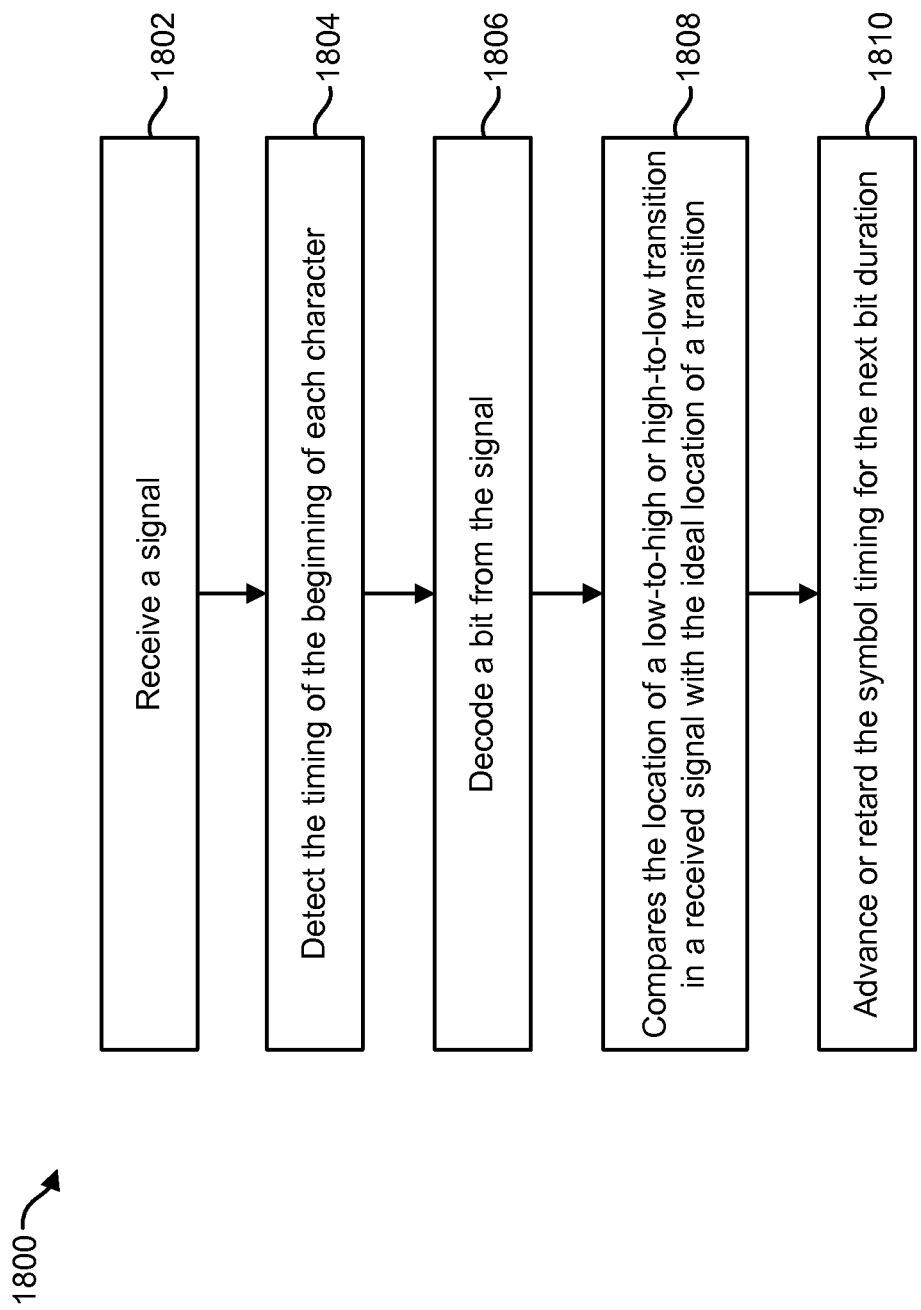
FIG. 18 is a flow diagram illustrating another possible method for estimating symbol timing error where modulation is performed in accordance with NFC type-B.

FIG. 18 is a flow diagram illustrating another possible method 1800 for estimating symbol timing error 144 where modulation is performed in accordance with NFC type-B. The method 1800 may be performed by a target NFC device 104. The target NFC device 104 may receive 1802 a signal 118 from an initiator NFC device 102. The received signal 118 may be modulated according to NFC type-B.

The target NFC device 104 may detect 1804 the timing of each character. For example, an acquisition block 132 may detect 1804 the beginning of each character. As indicated above, each character may include 10 bits: one bit indicating the start of a character, eight information bits, and one bit indicating the end of a character.

The target NFC device 104 may decode 1806 a bit from the signal 118. For example, a decoder 136 may decode the bit in a bit stream. The target NFC device 104 may feed back decoded bit to the time tracker 134. Alternatively, the time tracker 134 may perform decoding itself.

The target NFC device 104 may compare 1808 the location of a low-to-high or high-to-low transition in a received signal 118 with the ideal location of a transition (which is exactly the bit boundary). The difference of the two is the (estimated) symbol timing error 144.

The symbol timing 148 for the next bit duration may be advanced or retarded 1810. For example, the target NFC device 104 may add or subtract the symbol timing error 144 to/from a sample counter 142.

Figure 19:
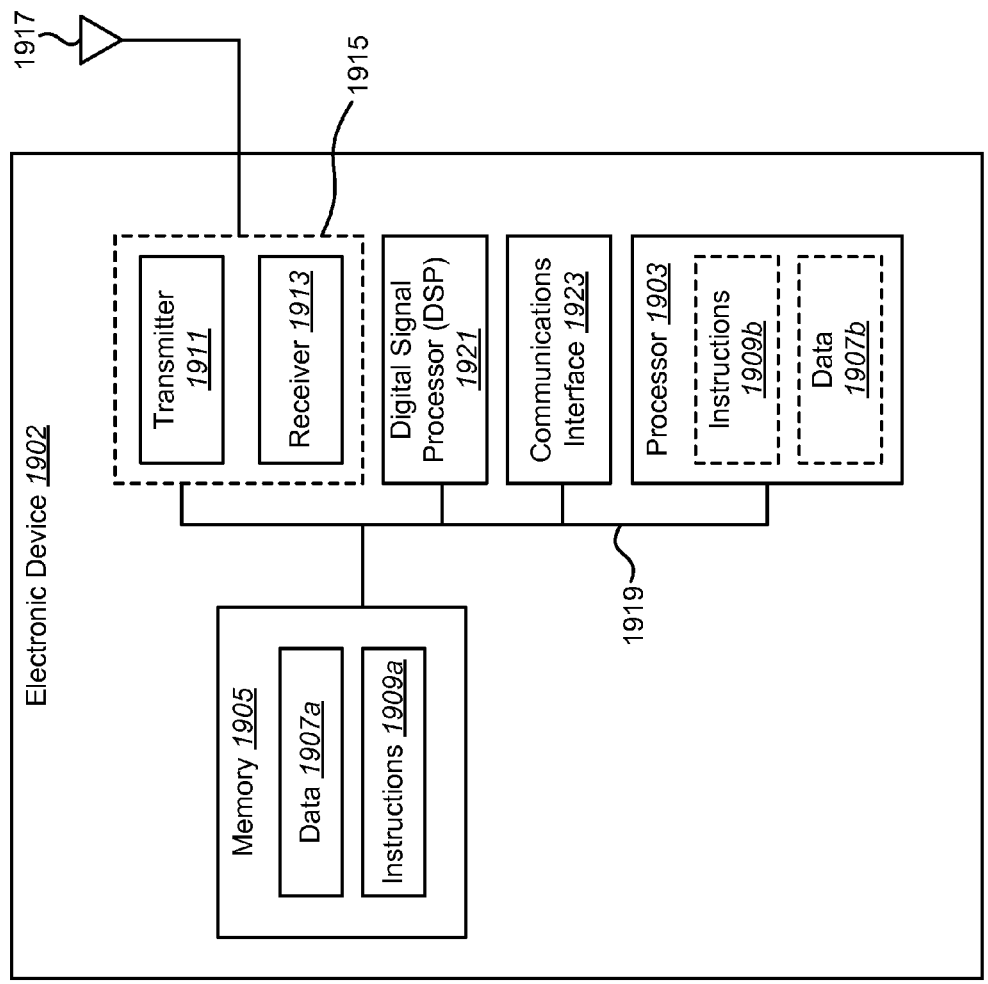
FIG. 19 illustrates certain components that may be included within an electronic device.

FIG. 19 illustrates certain components that may be included within an electronic device 1904. The electronic device 1904 may be an access terminal, a mobile station, a user equipment (UE), etc. For example, the electronic device 1904 may be the initiator NFC device 102 of FIG. 1.

The electronic device 1904 includes a processor 1903. The processor 1903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1903 may be referred to as a central processing unit (CPU). Although just a single processor 1903 is shown in the electronic device 1904 of FIG. 19, in an alternative configuration, a combination of processors (e.g., an ARM and DSP) could be used.

The electronic device 1904 also includes memory 1905 in electronic communication with the processor (i.e., the processor can read information from and/or write information to the memory). The memory 1905 may be any electronic component capable of storing electronic information. The memory 1905 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1907*a* and instructions 1909*a* may be stored in the memory 1905. The instructions may include one or more programs, routines, sub-routines, functions, procedures, code, etc. The instructions may include a single computer-readable statement or many computer-readable statements. The instructions 1909*a* may be executable by the processor 1903 to implement the methods disclosed herein. Executing the instructions 1909*a* may involve the use of the data 1907*a* that is stored in the memory 1905. When the processor 1903 executes the instructions 1909, various portions of the instructions 1909*b* may be loaded onto the processor 1903, and various pieces of data 1907*b* may be loaded onto the processor 1903.

The electronic device 1904 may also include a transmitter 1911 and a receiver 1913 to allow transmission and reception of signals to and from the electronic device 1904 via an antenna 1917. The transmitter 1911 and receiver 1913 may be collectively referred to as a transceiver 1915. The electronic device 1904 may also include (not shown) multiple transmitters, multiple antennas, multiple receivers and/or multiple transceivers.

The electronic device 1904 may include a digital signal processor (DSP) 1921. The electronic device 1904 may also include a communications interface 1923. The communications interface 1923 may allow a user to interact with the electronic device 1904.

The various components of the electronic device 1904 may be coupled together by one or more buses, which may include a power bus, a control signal bus, a status signal bus, a data bus, etc. For the sake of clarity, the various buses are illustrated in FIG. 19 as a bus system 1919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 11 and FIGS. 16-18, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inductively-coupled communications, comprising:
   receiving a signal from an inductively coupled communication device;
   analyzing the signal to estimate a symbol timing error, comprising:
   summing multiple samples in a first portion of the signal for a bit to form a first sum;
   summing multiple samples in a second portion of the signal for the bit to form a second sum;
   determining the symbol timing error based on at least the first sum and the second sum; and
   adjusting symbol timing to correct for the symbol timing error by adding or subtracting the estimated symbol timing error from a sample counter that counts samples from a start of a symbol.

2. The method of claim 1, wherein estimating the symbol timing error comprises comparing a location of a pause, a low-to-high or a high-to-low transition in the received signal with an ideal location of a pause or a transition.

3. The method of claim 1, wherein estimating the symbol timing error comprises detecting timing of a beginning of each character.

4. The method of claim 1, wherein estimating the symbol timing error is based on an output of one or more accumulators that accumulate samples during different periods in a bit duration.

5. The method of claim 1, wherein the summing multiple samples in a first portion comprises summing multiple samples in a first half of the signal for the bit to form the first sum (sumH1), wherein the summing multiple samples in the second portion comprises summing multiple samples in a second half of the signal for the bit to form the second sum (sumH2), wherein the symbol timing error is further determined based on a number of samples in each of the first sum and second sum (accumlength), wherein the symbol timing error is determined using the following calculations:
   when sumH1 is greater than or equal to sumH2:

$$\text{symbol timing error} = \text{sum}H1 + \text{sum}H2 - \text{accumlength};$$
   and when sumH1 is less than sumH2:

$$\text{symbol timing error} = -(\text{sum}H1 + \text{sum}H2 - \text{accumlength}).$$

6. The method of claim 1, wherein:
   modulation is performed in accordance with a near-field communication type-A standard;
   estimating the symbol timing error comprises comparing a location of a pause in a received signal with an ideal location of a pause corresponding to a decoded bit; and
   adjusting the symbol timing comprises adding or subtracting the estimated symbol timing error from a sample counter.

7. The method of claim 1, wherein:
   modulation is performed in accordance with a near-field communication type-F standard.

8. The method of claim 1, wherein:
   modulation is performed in accordance with a near-field communication type-B standard in which data is sent in characters;
   estimating the symbol timing error comprises detecting timing of a beginning of each character; and
   adjusting the symbol timing comprises incrementing initial symbol timing by a fixed bit duration.

9. The method of claim 1, wherein:
   modulation is performed in accordance with a near-field communication type-B standard in which data is sent in characters;
   estimating the symbol timing error comprises detecting timing of a beginning of each character and comparing a location of a low-to-high or high-to-low transition in a received signal with an ideal location of a transition; and
   adjusting the symbol timing comprises adding or subtracting the estimated symbol timing error from a sample counter.

10. A receiver for inductively-coupled communications, comprising:
    a receive antenna for receiving a signal from an inductively coupled communication device;
    a slicer that receives output samples from an analog-to-digital converter and generates a bit stream;
    an acquisition block that acquires packets and initial symbol timing;

a decoder; and a time tracker block that analyzes the signal to estimate a symbol timing error based on the initial symbol timing and the bit stream and adjusts symbol timing to correct for the symbol timing error by adding or subtracting the estimated symbol timing error from a sample counter that counts samples from a start of a symbol, wherein the time tracker block provides the symbol timing to the decoder, wherein the time tracker block analyzes the signal by:

summing multiple samples in a first portion of the signal for a bit to form a first sum;

summing multiple samples in a second portion of the signal for the bit to form a second sum;

determining the symbol timing error based on at least the first sum and the second sum.

11. The receiver of claim 10, wherein the estimating the symbol timing error comprises the time tracker block comparing a location of a pause, a low-to-high or a high-to-low transition in the received signal with an ideal location of a pause or a transition.

12. The receiver of claim 10, wherein:

modulation is performed in accordance with a near-field communication type-A standard;

estimating the symbol timing error comprises the time tracker block comparing a location of a pause in a received signal with an ideal location of a pause corresponding to a decoded bit; and adjusting the symbol timing comprises the time tracker block adding or subtracting the estimated symbol timing error from a sample counter.

13. The receiver of claim 10, wherein:

modulation is performed in accordance with a near-field communication type-F standard.

14. The receiver of claim 10, wherein:

modulation is performed in accordance with a near-field communication type-B standard in which data is sent in characters;

estimating the symbol timing error comprises the time tracker block detecting timing of a beginning of each character; and adjusting the symbol timing comprises the time tracker block incrementing initial symbol timing by a fixed bit duration.

15. The receiver of claim 10, wherein:

modulation is performed in accordance with a near-field communication type-B standard in which data is sent in characters;

estimating the symbol timing error comprises the time tracker block detecting timing of a beginning of each character and comparing a location of a low-to-high or high-to-low transition in a received signal with an ideal location of a transition; and adjusting the symbol timing comprises the time tracker block adding or subtracting the estimated symbol timing error from a sample counter.

16. A computer-program product for inductively-coupled communications, the computer-program product comprising a non-transitory computer-readable medium having instructions thereon, the instructions comprising:

code for causing an electronic device to receive a signal from an inductively coupled communication device;

code for causing the electronic device to analyze the signal to estimate a symbol timing error, comprising:

code for summing multiple samples in a first half of a portion of the signal for a bit to form a first sum;

code for summing multiple samples in a second half of the portion of the signal for the bit to form a second sum;

code for determining the symbol timing error based on at least the first sum and the second sum; and code for causing the electronic device to adjust symbol timing to correct for the symbol timing error by adding or subtracting the estimated symbol timing error from a sample counter that counts samples from a start of a symbol.

17. The computer-program product of claim 16, wherein:

modulation is performed in accordance with a near-field communication type-A standard;

the code for causing the electronic device to estimate the symbol timing error comprises code for causing the electronic device to compare a location of a pause in a received signal with an ideal location of a pause corresponding to a decoded bit; and the code for causing the electronic device to adjust the symbol timing comprises code for causing the electronic device to add or subtract the estimated symbol timing error from a sample counter.

18. The computer-program product of claim 16, wherein:

modulation is performed in accordance with a near-field communication type-F standard.

19. The computer-program product of claim 16, wherein:

modulation is performed in accordance with a near-field communication type-B standard in which data is sent in characters;

the code for causing the electronic device to estimate the symbol timing error comprises code for causing the electronic device to detect timing of a beginning of each character; and the code for causing the electronic device to adjust the symbol timing comprises code for causing the electronic device to increment initial symbol timing by a fixed bit duration.

20. The computer-program product of claim 16, wherein:

modulation is performed in accordance with a near-field communication type-B standard in which data is sent in characters;

the code for causing the electronic device to estimate the symbol timing error comprises code for causing the electronic device to detect timing of a beginning of each character and code for causing the electronic device to compare a location of a low-to-high or high-to-low transition in a received signal with an ideal location of a transition; and the code for causing the electronic device to adjust the symbol timing comprises code for causing the electronic device to add or subtract the estimated symbol timing error from a sample counter.

* * * * *